US011892468B2

(12) United States Patent
Muzilla et al.

(10) Patent No.: US 11,892,468 B2
(45) Date of Patent: *Feb. 6, 2024

(54) METHOD AND SYSTEM FOR SCANNING OF A TRANSPARENT PLATE DURING EARTH OBSERVATION IMAGING

(71) Applicant: DRS Network & Imaging Systems, LLC, Melbourne, FL (US)

(72) Inventors: Mark Muzilla, Riverside, CA (US); Harvey M. Spencer, Rolling Hills Estates, CA (US); Raymond Wagoner, Garden Grove, CA (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,237

(22) Filed: Jun. 24, 2022

(65) Prior Publication Data

US 2022/0326273 A1 Oct. 13, 2022

Related U.S. Application Data

(63) Continuation of application No. 16/555,735, filed on Aug. 29, 2019, now Pat. No. 11,402,401.

(Continued)

(51) Int. Cl.
*G01P 3/36* (2006.01)
*G01P 3/40* (2006.01)
(Continued)

(52) U.S. Cl.
CPC .......... *G01P 3/40* (2013.01); *G01P 3/36* (2013.01); *G01P 3/38* (2013.01); *G02B 21/006* (2013.01);
(Continued)

(58) Field of Classification Search
None
See application file for complete search history.

(56) References Cited

U.S. PATENT DOCUMENTS 2,974,230 A 3/1961 Harris
7,763,587 B2 7/2010 Michelet et al.
(Continued)

OTHER PUBLICATIONS

U.S. Appl. No. 16/555,735, Non-Final Office Action, dated Nov. 4, 2021, 7 pages.
(Continued)

*Primary Examiner* — Mark Hellner
(74) *Attorney, Agent, or Firm* — Kilpatrick Townsend & Stockton LLP

(57) ABSTRACT

A method of using an imaging system including a focal plane with one or more detectors, a lens optically coupled to the focal plane, a transparent plate optically coupled to the focal plane and lens, and an actuator coupled to the transparent plate, includes receiving, at a first area of the focal plane through the lens, light from an object at a first time. The imaging system is located in a first position relative to the object at the first time. The method also includes causing the actuator to move the transparent plate in response to movement of the imaging system relative to the object and receiving, at the first area of the focal plane through the lens, light from the object at a second time. The imaging system is located in a second position relative to the object at the second time.

19 Claims, 13 Drawing Sheets

Related U.S. Application Data

(60) Provisional application No. 62/724,513, filed on Aug. 29, 2018.

(51) Int. Cl.
*G02B 21/26* (2006.01)
*G02B 21/00* (2006.01)
*G01P 3/38* (2006.01)
*G02B 21/24* (2006.01)
*G02B 3/00* (2006.01)

(52) U.S. Cl.
CPC .......... *G02B 21/008* (2013.01); *G02B 21/26* (2013.01); *G02B 3/0037* (2013.01); *G02B 21/245* (2013.01)

(56) References Cited

U.S. PATENT DOCUMENTS

| 8,023,183 B1 | 9/2011 | Cook |
| 11,402,401 B2 * | 8/2022 | Muzilla ..................... G01P 3/38 |
| 2014/0002665 A1 | 1/2014 | Kingdon et al. |
| 2020/0145568 A1 | 5/2020 | Vollmerhausen |

OTHER PUBLICATIONS

U.S. Appl. No. 16/555,735, Notice of Allowance, dated Apr. 7, 2022, 7 pages.

\* cited by examiner

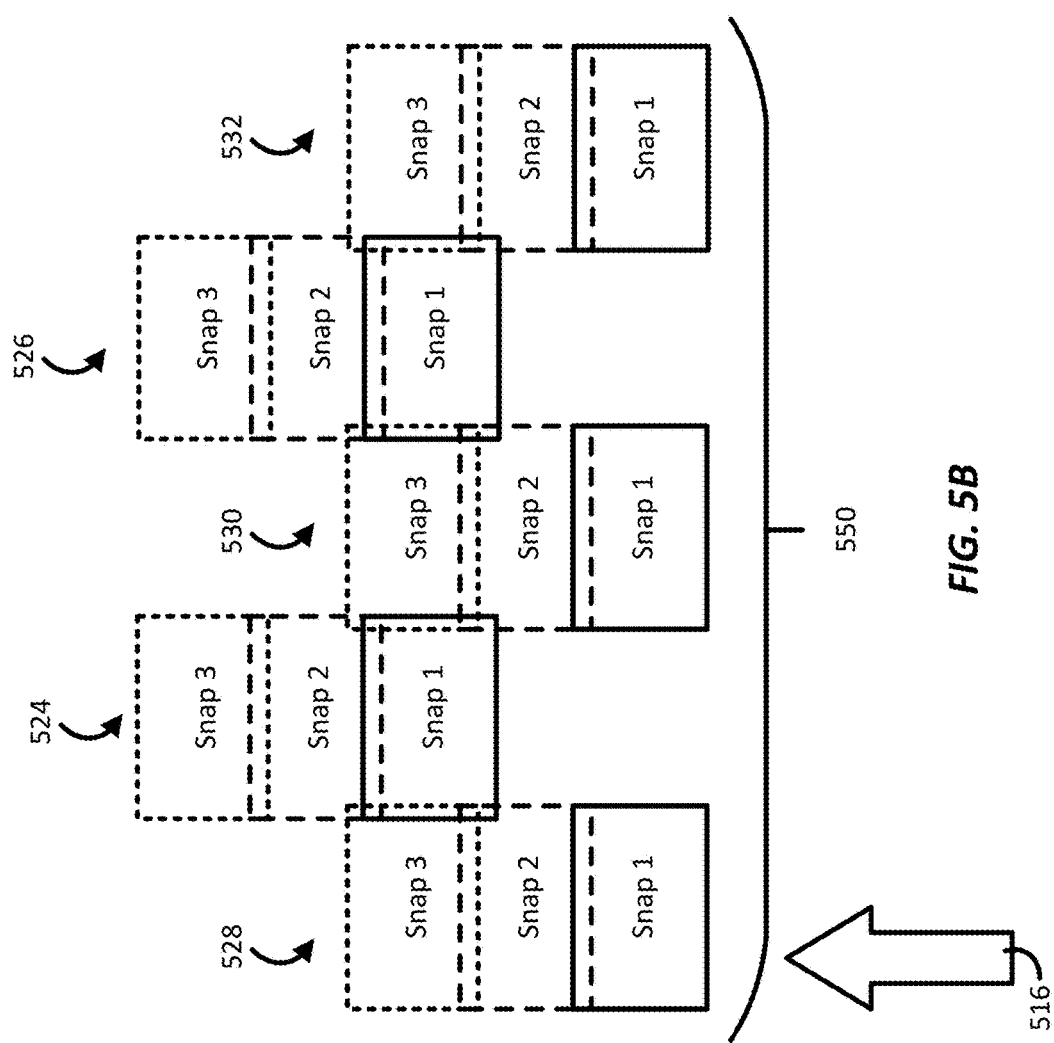
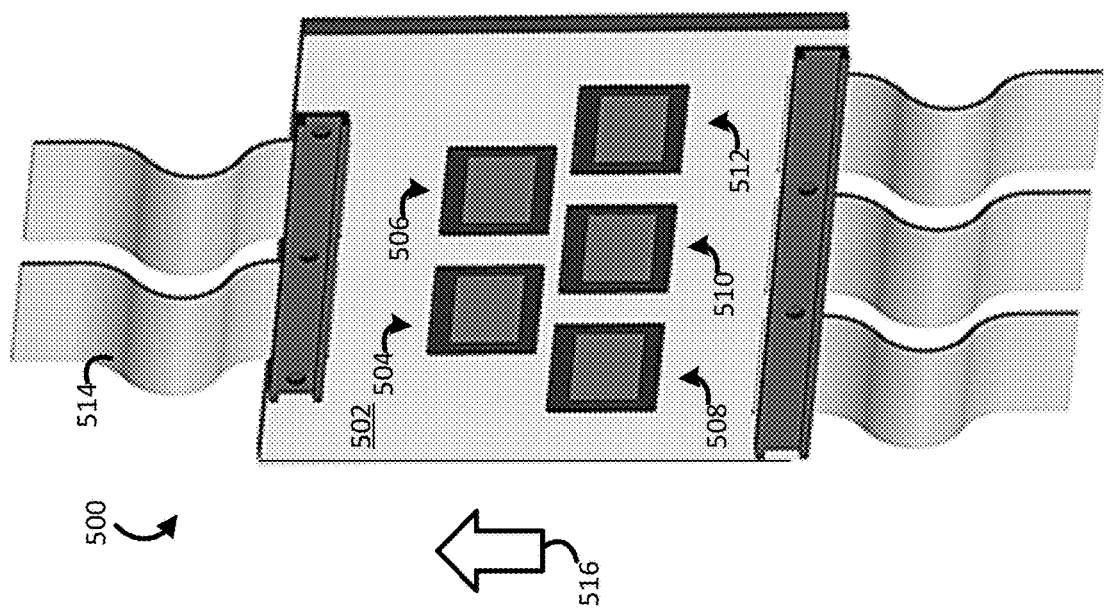
FIG. 5B
FIG. 5A

METHOD AND SYSTEM FOR SCANNING OF A TRANSPARENT PLATE DURING EARTH OBSERVATION IMAGING

CROSS-REFERENCES TO RELATED APPLICATIONS

This application is a continuation of U.S. application Ser. No. 16/555,735, filed on Aug. 29, 2019, entitled "Method and System for Scanning of a Transparent Plate During Earth Observation Imaging," which claims priority to U.S. Provisional Patent Application No. 62/724,513, filed on Aug. 29, 2018, entitled "Method and System for Scanning of a Transparent Plate During Earth Observation Imaging," the disclosures of which are hereby incorporated by reference in their entireties for all purposes.

BACKGROUND OF THE INVENTION

Satellite imaging has been developed. Satellite ground velocity, which depends on orbit altitude, can be as high as 8 km/s. As a result of the high ground velocity, low earth orbit imaging applications using staring sensors experience image smearing. Thus, there is a need in the art for improved methods and systems related to satellite imaging.

Embodiments of the invention address these and other problems individually and collectively.

SUMMARY OF THE INVENTION

Embodiments of the present invention relate generally to systems and methods for image stabilization and, in particular, to reduction of image blur or smear using a transparent plate rotation system. The transparent plate rotation system can introduce a backscan to reduce or remove image smear, improve relative edge response, allow an increased integration time associated with an image, and/or allow several successive images to be captured of the same scene for image processing. Increasing the integration time can improve the signal to noise ratio of the sensor and improve the ability to detect features in the observed scene. Processing several successive frames of the same scene can further improve signal to noise ratio and allow for more complex algorithms to detect more challenging features in the observed scene. Backscanning via the rotating transparent plate reduces or eliminates the need to incorporate additional scan mirrors or other complex and heavy mechanical systems to stabilize the image.

According to an embodiment of the present invention, an imaging system is provided. The imaging system includes a body, a stage coupled to the body, and a focal plane array including one or more detectors and coupled to the stage. The imaging system can also include a lens coupled to the body and optically coupled to the focal plane array, and a transparent plate coupled to the body and optically coupled to the focal plane array and lens. The transparent plate can be disposed between the focal plane array and the lens. Additionally, an actuator can be coupled to the transparent plate. The actuator can be configured to rotate the transparent plate in one or more directions relative to the focal plane array. In some embodiments, the transparent plate is disposed at an exit pupil of the imaging system, but this is not required by the present invention and in some embodiments, the transparent plate is disposed between the objective lens and the exit pupil. In yet other embodiments, the transparent plate is disposed between the rear lens group and the focal plane array. Moreover, in some embodiments the transparent plate comprises a planar optical element and is characterized by no optical power, whereas in other embodiments, one or more surfaces of the transparent plate are characterized by a predetermined curvature and the transparent plate is characterized by a non-zero optical power. These embodiments will be described in additional detail herein.

According to another embodiment of the invention, a method is provided. The method includes determining a travel velocity corresponding to motion of a body of an imaging system, and determining a rotation rate for a transparent plate of the imaging system based on the travel velocity. The transparent plate is optically coupled to an image sensor of the imaging system and a lens of the imaging system. The method also includes sending a first control signal to an actuator to rotate the transparent plate at the determined rotation rate, and sending a second control signal to an image sensor of the imaging system to capture one or more frames while the actuator rotates the transparent plate. The method further comprises determining that the transparent plate reaches a cutoff angle, and thereafter, sending a third control signal to reset the transparent plate to an initial position.

According to a specific embodiment of the present invention, a method of using an imaging system comprising a focal plane array with one or more detectors, a lens optically coupled to the focal plane array, a transparent plate optically coupled to the focal plane array and lens, the transparent plate being disposed between the focal plane array and the lens, and an actuator coupled to the transparent plate, the actuator being configured to move the transparent plate in one or more directions relative to the focal plane array is provided. The method includes receiving, at a first area of the focal plane array through the lens, light from an object at a first time. The imaging system is located in a first position relative to the object at the first time. The method also includes causing the actuator to move the transparent plate in response to movement of the imaging system relative to the object and receiving, at the first area of the focal plane array through the lens, light from the object at a second time. The imaging system is located in a second position relative to the object at the second time.

In an embodiment, moving the transparent plate comprises rotating the transparent plate. In one implementation, the method also includes determining a travel velocity corresponding to the movement of the imaging system relative to the object and determining, based on the travel velocity, a rotation rate for the transparent plate. Causing the actuator to rotate the transparent plate can include rotating the transparent plate at the determined rotation rate. In some embodiments, the rotation rate is not constant. As an example, the rotation rate can change based on an angle position of the transparent plate. In a specific embodiment, the method further includes determining, based on the travel velocity, a rotation direction for the transparent plate. In this specific embodiment, causing the actuator to rotate the transparent plate can include rotating the transparent plate in the determined rotation direction. For example, the travel velocity can correspond to the movement of the imaging system corresponds to a travel velocity of at least one of an aircraft or a satellite. In an embodiment, the method further comprises causing the one or more detectors to capture image data, for example, during rotation of the transparent plate. For instance, rotation of the transparent plate can cause light from the object to be received at the first area of the focal plane array at both the first time and the second time. In another embodiment, the transparent plate can be a flat plate with no optical power or a curved plate with non-zero optical power.

Numerous benefits are achieved by way of the present invention over conventional techniques. For example, embodiments of the present invention provide methods and systems that utilize controlled rotation of a transparent plate to correct for image smearing in high-velocity imaging systems, such as satellites and airplanes, thereby improving image quality. In some implementations, use of a transparent plate enables optical components that are small and light, thereby providing a compact package suitable for airborne or space-based platforms. These and other embodiments of the invention along with many of its advantages and features are described in more detail in conjunction with the text below and attached figures.

BRIEF DESCRIPTION OF THE DRAWINGS

Illustrative embodiments of the present disclosure are described in detail below with reference to the following drawing figures.

FIG. 5A illustrates a focal plane array consisting of 5 stagger butted focal planes on a stage, according to an embodiment of the present invention.

FIG. 5B illustrates the ground swath width of a scan associated with 5 stagger butted focal planes, according to an embodiment of the present invention.

DETAILED DESCRIPTION OF SPECIFIC EMBODIMENTS

Figure 1:
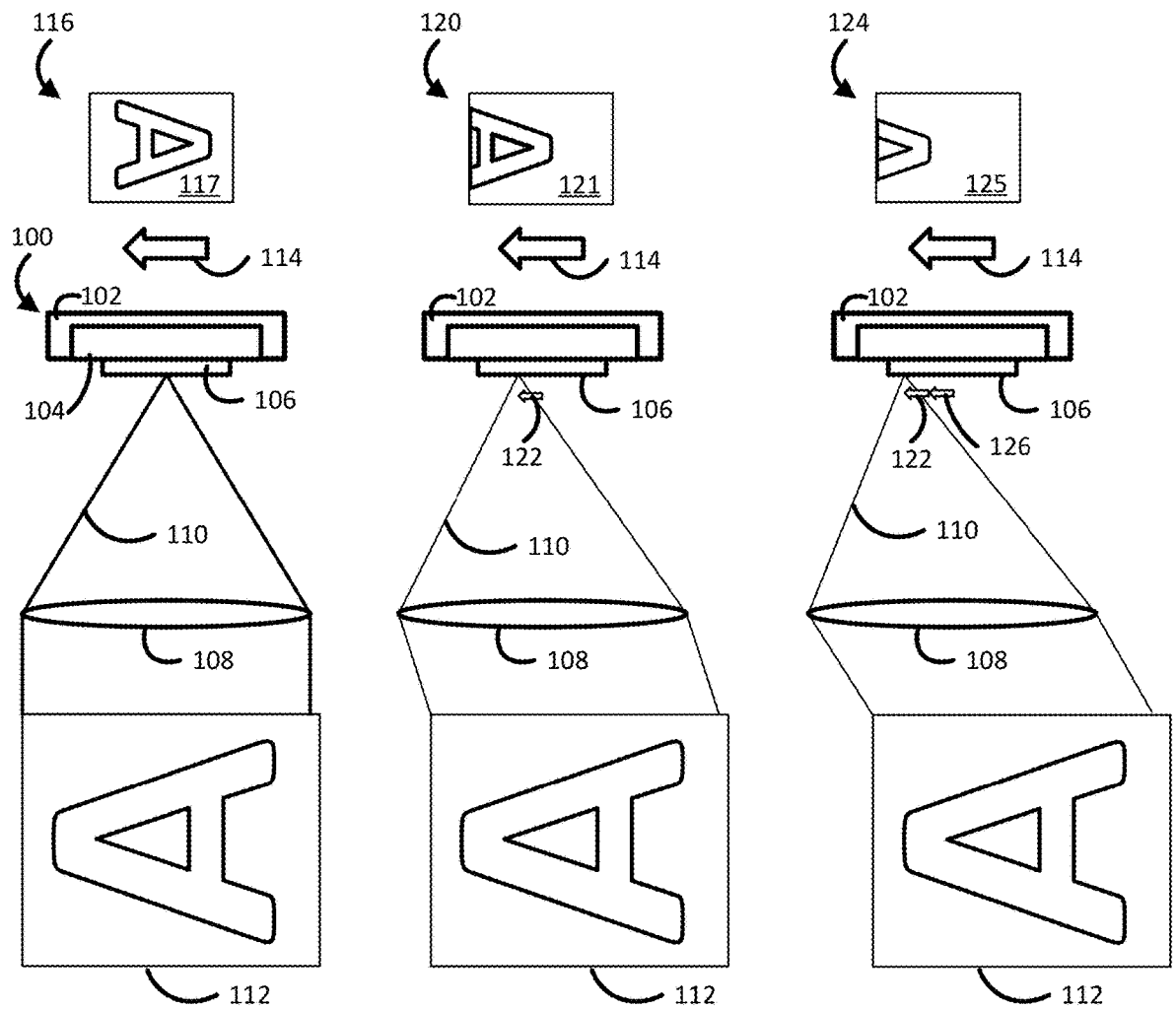
FIG. 1 illustrates three successive frames captured using an imaging system that does not compensate for the motion of the camera body, according to an embodiment of the present invention.

Numerous sources of interference exist in satellite imaging technologies. To improve the signal to noise ratio of an image of a scene on the ground, individual frames of the scene on the ground captured by an image detector can be co-added. Co-adding is simplified if the image hasn't moved relative to the detector and no image registration is required. Problematically, large staring focal plane arrays used in modern satellites and aerial cameras are subject to image blur or smear due to the motion of the stage during the exposure time. The image blur or smear reduces the useful integration time for a large staring focal plane array and as a result, image quality.

One existing technology to address image blur caused by the motion of a focal plane array in a moving platform, such as a satellite, include complex mechanical systems to physically steer the entire optical system (e.g., the lens barrel) to control the pointing of the image on the focal plane array. Another conventional technique to stabilize an image during a focal plane array integration time is to incorporate fast steering mirrors in the optical chain. Fast steering mirrors are large and can take up a significant amount of space, especially when located at the entrance aperture of the optical system. Because of their size, large moving mirrors require more time to move and time to settle before the integration time can commence, leaving less time for integration of signal and/or frame stacking.

Embodiments of the present invention provide an alternative method for reducing image blur or smear present in scans taken using high altitude imaging systems, for example, satellite-based imaging systems. More specifically, embodiments of the present invention utilize a rotating transparent plate to steer the light incident on a detector. The transparent plate can be positioned in any suitable location along the optical path. In some embodiments, the transparent plate is positioned in a location with the light ray bundle is smallest in diameter, such that the transparent plate can be small. For example, the transparent plate can be positioned at or near an exit pupil. The transparent plate can be a relatively small optical element, which therefore is easier to control, faster to reset, and less disruptive than the larger moving mirrors. The rest of the optical elements within the optical system can remain fixed, as the image can be steered using only the transparent plate. Accordingly, embodiments described herein are more compact and improve performance, efficiency, and reliability over conventional techniques used for spaceborne and airborne applications.

In some embodiments, the transparent plate and image detector can be part of a satellite space platform that is moving relative to the earth. The transparent plate can be rotated within an axis normal to the axis of the detector's motion relative to the earth, such that the transparent plate rotation opposes the detector's motion. The rotation rate and rotation direction can be matched to the travel velocity of the satellite resulting in a backscan so that the image appears static (e.g., incident on the same area of the detector) during a focal plane array integration period.

In some embodiments, the integration period can be continuous during the duration of the backscan of the transparent plate. In other embodiments, multiple consecutive frames can be stacked together to form a single snap. The backscan of the transparent plate results in the target image not moving relative to the focal plane array during the backscan. The transparent plate can return to a starting position while the trailing edge of the field of view moves across a scene on the ground that has already been captured.

In some embodiments, the focal plane array can include a focal plane array that captures images from multiple spectral bands. Embodiments of the present invention provide a stabilized staring imager. The use of this technology enables the use of staring focal plane arrays in applications that have a scan motion that historically used linear scan sensors.

Prior to discussing specific embodiments of the invention, some terms may be described in detail.

A "transparent plate" can include an optical element that is fully transparent, partially transparent or translucent, or otherwise transmissive to some or all wavelengths of electromagnetic radiation. In some embodiments, a transparent plate can have a flat surface. For example, a transparent plate can have two parallel sides, such that that the surface of the transparent plate is not curved in at least one direction, and such that the transparent plate has little or no optical power. For example, a flat transparent plate can shift the path of an incident light ray to the side without changing the angle or direction of travel of the light ray.

In other embodiments, a transparent plate can include some curvature. For example, the edges of the transparent plate can be slightly curved (e.g., either concave or convex), and can have some optical power. The optical power and curvature can be configured to, in conjunction with other lenses in the system, produce a uniform shift in the image across large fields of view. In some embodiments, a transparent plate can include two adjacent plates. A transparent plate can be composed of any suitable materials that are optically transparent materials, such as fused silica, sapphire, diamond, Silicon, or Germanium. A transparent plate may have a high index of refraction such that incident light is shifted by a larger distance. A transparent plate can include a thickness of 1-5 mm, larger than 5 mm, or any other suitable thickness.

A focal plane array can be positioned at a focal plane that can include an area where an image is in focus. The focal plane can be perpendicular to the optical axis of a lens or group of lenses. The location of a focal plane can be a property of a combination of optical elements. In some embodiments, light detectors can be placed at or near a focal plane. In some embodiments, a focal plane array can refer to a physical platform in an optical system where an image is in focus, and/or one or more light detectors within an optical system.

FIG. 1 illustrates three successive frames captured using an imaging system that does not compensate for the motion of the camera body. The imaging system 100 includes a detector module 102, a stage 104, a focal plane array 106, and a lens 108. In some embodiments, the imaging system 100 can be mounted in a moving vehicle such as a satellite, an aircraft, an automobile, and the like. FIG. 1 also illustrates the rays 110 associated with an object on the ground 112.

In FIG. 1, the imaging system 100 is moving at a velocity 114 over the object on the ground 112. In a first frame 116, the rays 110 associated with the object on the ground 112 are centered on the focal plane array 106 and a first image 117 on the focal plane array 106 shows the object on the ground 112. The motion of the system causes the image plane formed by the lens 108 to move. For a second frame 120, imaging system 100 has moved relative to the object on the ground 112 due to the velocity 114 of the imaging system 100. In the second frame 120, the rays 110 associated with the object on the ground 112 are no longer centered on the focal plane array 106 but have moved a first distance 122. Accordingly, a second image 121 on the focal plane array 106 is different from the first image 117.

For a third frame 124, the imaging system 100 has moved further relative to the object on the ground 112 due to the velocity 114 of the imaging system 100. In the third frame 124, the rays 110 associated with the object on the ground 112 have now moved the first distance 122 and a second distance 126. Accordingly, a third image 125 on the focal plane array 106 is different from the first image 117 and the second image 121. If an image of the object on the ground 112 was produced without image registration from the integration of the first image 117, the second image 121, and the third image 125, the integrated image of the object on the ground 112 would include significant blur. To prevent image blur from within the first image 117, the second image 121 or the third image 125, the integration time of the sensor must be significantly less than the time it takes for a single pixel on the sensor to move one pixel length. Otherwise, significant image blur occurs within each of the first image 117, the second image 121 or the third image 125.

Figure 2A:
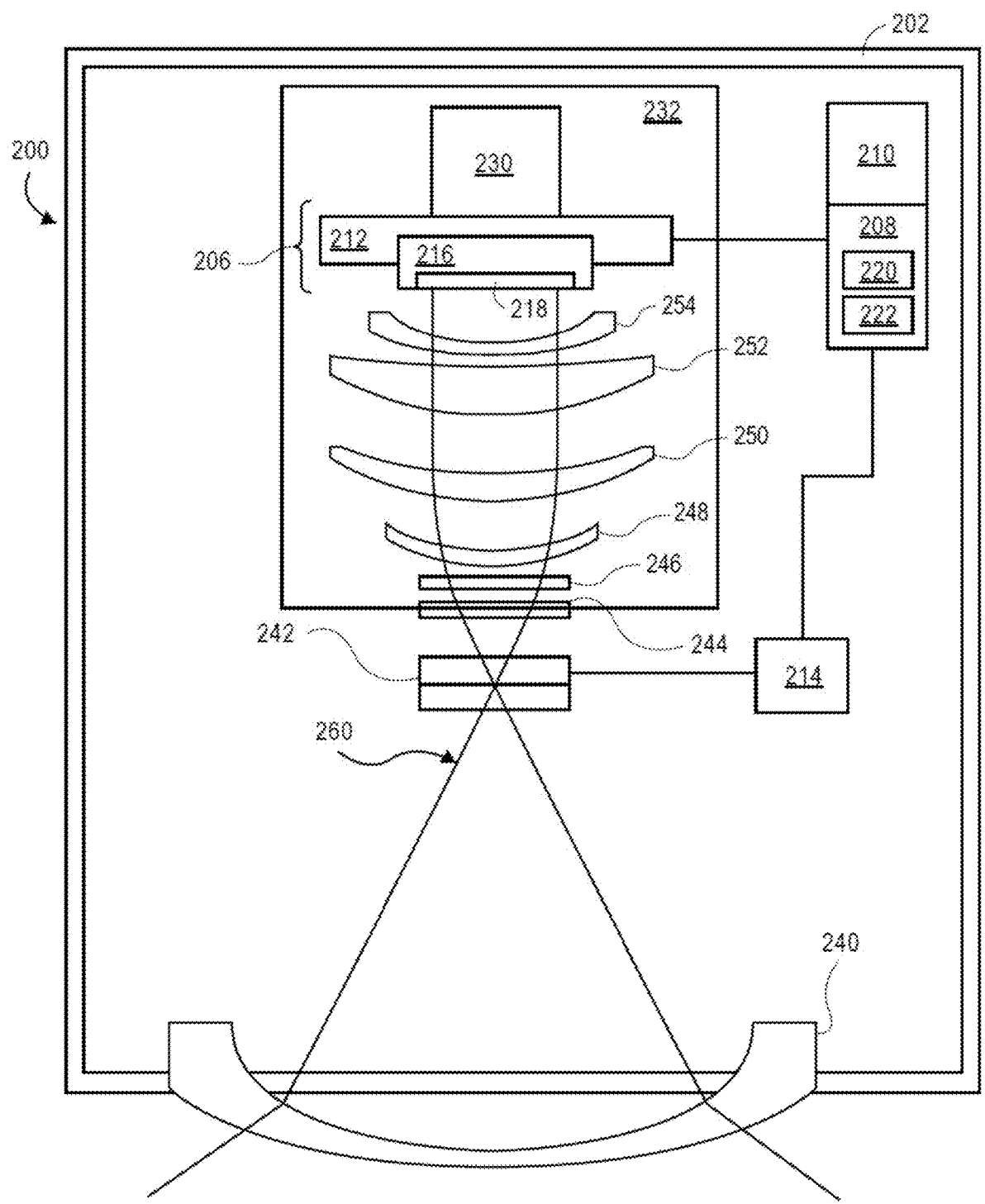
FIG. 2A illustrates an imaging system configured to backscan an image via rotation of a transparent plate during motion of the imaging system according to an embodiment of the present invention.

FIG. 2A illustrates an imaging system configured to backscan an image via rotation of a transparent plate during motion of the imaging system according to an embodiment of the present invention. Rotating a transparent plate to backscan the image makes it possible to dwell long enough during an image to obtain a reasonable Signal to Noise Ratio (SNR). Backscanning also allows frame stacking of successively captured frames, reducing blurring the image. If the noise is "white" in nature, frame stacking benefits the SNR by the square root of the number of frames stacked. An image made up of 4 frames stacked has 2× higher SNR than an image taken with one frame.

The imaging system 200 can include a camera body 202, a dewar 232, a cooling device 230, a detector module 206, a number of optical elements (e.g., optical elements 240, 242, 244, 246, 248, 250, 252, and 254), a controller 208, and an I/O module 210. In some embodiments, the camera body 202 of the imaging system 200 is positioned in a vehicle or platform such as satellite or an aircraft. In some embodiments, the camera body 202 can be configured to provide structural support and alignment for the detector module 206 and the optical elements. In some embodiments, the camera body can include anchor points for the controller 208 and the I/O module 210 and can be configured to manage heat transfer and isothermal performance. In other embodiments, the camera body 202 can be replaced by two separate bulkheads. A first subset of the optical elements (e.g., 240 and 242) can be mounted on a first bulkhead and the dewar 232 (e.g., and enclosed elements), controller 208, and I/O module 210 can be mounted on a second bulkhead.

In some embodiments, the optical elements (e.g., 240, 242, 244, 246, 248, 250, 252, and 254) can include one or more lenses, filters, a beam splitter, a collimator, a diffraction grating, and/or any other suitable components. In one specific example, the optical elements can be a transparent plate 242, an objective lens 240, which can be a large outer lens, a window 244 placed at an optical opening into the dewar 232, a band-pass filter 246, a first lens 248, a second lens 250, a third lens 252, and a fourth lens 254. Together, the lenses (e.g., 240, 248, 250, 252, and 254) can form an inverse telephoto lens system. The band-pass filter 246 can be designed to be transparent for a specific range of electromagnetic radiation. For example, in some embodiments, the band-pass filter 246 may pass some or all wavelengths of infrared light. In one example, the band-pass filter 246 may allow wavelengths in the range of 2.7 μm-4.4 μm to pass.

As shown in FIG. 2A, in some embodiments, the optical elements, 246, 248, 250, 252, and 254 can all be positioned inside the dewar 232, while the transparent plate 242 and the objective lens 240 can be positioned outside the dewar 232. For this reason, the lenses 248, 250, 252, and 254 can be referred to as inner lenses and the set of lenses 248, 250, 252, and 254 can be referred to as a rear lens group. Thus, a lens assembly including objective lens 240 and the rear lens group is illustrated in FIG. 2A is provided according to embodiments of the present invention. In some implementations, it can be advantageous to place optical elements inside the dewar 232, as they can thereby be kept cold to reduce background radiation. There can also be additional or less optical elements, and the optical elements shown in FIG. 2A are just one example of possible configurations. In some embodiments, the optical elements can be optimized for the transmission of a specific wavelength such as visible, near-infrared, short-wavelength infrared, mid-wavelength infrared, long-wavelength infrared, and far infrared.

In some embodiments, the combination of optical elements in the imaging system 200 can have a focal length that varies across the field of view. For example, the focal length can be 12.5 mm at the center of the optical axis (e.g., normal to the detector module 206), and the focal length can be 46.3 mm at the edge of the observed image area. The field of view can cover a range of 121 degrees from one image edge to another, and the imaging system 200 can have an f-number of f/2.7. The imaging system 200 can be designed to image a spectral band of 2.7 μm-4.4 μm. The above parameter values are examples, and the imaging system 200 can be configured in any other suitable manner.

In some embodiments, the transparent plate 242 can be a transmissive optical element with little or no optical power. Embodiments of the present invention do not require that the transparent plate 242 has no optical loss, but that a suitable amount of light is transmitted as appropriate to the particular application. As an example, an optical material that is characterized by a transmittance of greater than 95%, greater than 96%, greater than 97%, greater than 98%, or greater than 99%. Thus, the transparent plate 242 does not have to be characterized by an absorbance of zero, but includes optical elements that are characterized by a finite but suitable transmittance. In the direction of the optical path, the transparent plate 242 may be flat and non-curved, with an constant width dimension (e.g., along the optical path). A cross-sectional area of the transparent plate 242 (e.g., within a plane normal to the optical path) can have any suitable length and height. In some embodiments, the size of the cross-sectional area can be as small as possible to minimize weight and rotational inertia, while still being large enough to accommodate the entire light ray bundle in the optical path. The cross-section of the transparent plate 242 can take the shape of a circle or oval (e.g., such that the 3-dimensional shape is a disk), the shape of a rectangle (e.g., such that the 3-dimensional shape is a box), or any other suitable shape. Embodiments of the invention allow the transparent plate 242 to include glass and/or any other suitable material. Additionally, the transparent plate 242 can include two separate plates that are located adjacent to one another and/or directly attached.

Due to the shape and optical properties of the transparent plate, embodiments allow the transparent plate 242 to shift the location of an image on a focal plane of the detector module 206 without otherwise modifying the shape, size, focus, or other attributes of the image. The transparent plate 242 can accomplish this by, for example, redirecting the trajectory of incoming light rays as a group. The transparent plate 242 may be able to shift incoming bundle of light rays to the side and/or change the angle of the bundle without otherwise affecting the bundle at the focal plane.

The magnitude and direction of the image shift on the focal plane can be dependent on the angular position of the transparent plate 242. For example, if the surface of the transparent plate 242 is oriented normal to the optical path (e.g., with an angle of zero degrees), the transparent plate 242 may have no effect or a negligible effect on the incoming light rays and resulting image. If the transparent plate 242 is instead rotated to have an angle relative to the optical path, the incoming light rays and resulting image on the focal plane can be shifted. Since an object image will move across the focal plane as the camera body 202 moves with respect to the earth, tilting of the transparent plate 242 can be used to move the object image in an equal and opposite direction to thereby cancel out the movement and keep the object image in the same location on the focal plane. In some embodiments, the transparent plate 242 can shift the image formed at the focal plane array 218 by up to 100 microns.

Embodiments allow the transparent plate 242 to be located in any suitable position along the optical path. For example, the transparent plate 242 can be placed in the middle of an optical system, somewhere between the objective lens 240 (e.g., the first element that receives light from a scene being observed) and the last optical element 252 (e.g., the last element to affect the light before it goes to the image sensor) where there is enough space to operate the transparent plate rotation. In some embodiments the transparent plate 242 can be placed where the light ray bundle is the smallest (e.g., has the smallest cross-section or diameter). For example, the transparent plate 242 can be positioned at or near an exit pupil. This allows a small sized transparent plate 242 to be used in the imaging system 200, so as to reduce the weight and momentum of the transparent plate 242, as well as to minimize the space required by the transparent plate 242 within the imaging system. Minimizing the transparent plate 242 reduces negative effects, such as disturbance caused by movement of the transparent plate 242, and also enables a reduction in the power and structures used for supporting and moving the transparent plate 242. In some embodiments, the transparent plate 242 can be the limiting factor on the field of view, and the transparent plate 242 can create the exit pupil. Additionally, the transparent plate 242 can be located outside the dewar 232 so that the transparent plate 242 can be controlled without disturbing the cold area.

The actuator 214 can be coupled to the transparent plate 242 and be configured to move the transparent plate 242 in one or more directions relative to the focal plane array 218. In some embodiments, moving the transparent plate 242 may only include rotating the transparent plate 242. In other embodiments, the transparent plate 242 can also be moved forward, moved laterally, or otherwise moved in any other suitable manner. In some embodiments, the actuator 214 can include a piezoelectric actuator.

In some embodiments, the actuator 214 can be configured to move the transparent plate 242 to counter the motion of a satellite platform or aircraft. The actuator 214 can be configured to rotate the transparent plate 242 about a single axis or multiple axes. The actuator 214 can rotate the transparent plate 242 within any suitable range of angles, such as between zero degrees (e.g., normal to the optical path) and 90 degrees in any direction and about any axis. In some embodiments, the actuator 214 can provide a backscan resolution on the order of 0.1 nm. In other embodiments, the actuator 214 can provide a backscan resolution on the order of 2 nm.

Although some embodiments have been discussed in terms of a piezoelectric actuator, it should be understood such that the actuator can be implemented using mechanical actuators, electro-mechanical actuators, hydraulic actuators, pneumatic actuators, and the like. Thus, the term actuator 214 is not intended to denote a piezoelectric actuator, but to encompass machines that move or control a transparent plate 242 for backscanning. One of ordinary skill in the art would recognize many variations, modifications, and alternatives.

In some embodiments, the actuator 214 can include one or more sensors to monitor the motion and position of the transparent plate 242. The one or more sensors can measure angle position, velocity, acceleration, and the like which affect image smearing. In some embodiments the one or more sensors are capacitive sensors. In other embodiments, the one or more sensors can include a laser displacement sensor. The position of the transparent plate 242 can be transmitted to the controller 208 and/or the I/O module 210 for use in image processing and control loop calculations.

The detector module 206 can include a base 212, a stage 216, and a focal plane array 218. The base 212 of the detector module 206 can be coupled to the camera body 202 and/or the controller 208. In some embodiments, the detector module 206 is communicatively coupled to the controller 208 and/or the I/O module 210. In some embodiments, the controller 208 may be positioned outside the camera body 202.

The stage 216 can include the focal plane array 218. The focal plane array 218 can be configured with one or more focal plane arrays operable to collect image data. In some embodiments, the focal plane array 218 can include an infrared focal plane array detector. The an infrared focal plane array detector can consist of an array of pixels, each pixel being made up of several layers. In some embodiments, the focal plane array 218 can be a visible sensor. In some embodiments, the focal plane array 218 can operate without cooling of a detector material. In other embodiments, the detector module 206 can include thermal strapping between the focal plane array 218 and the base 212. In some embodiments, the focal plane array 218 can include one or more spectral filters. In some embodiments, the focal plane array 218 can be a multi-spectral band imager. In other embodiments, the focal plane array can include a CMOS sensor, a CCD sensor, or the like.

In some embodiments, unit cells (pixel elements) can include sub-10 μm dimensions. In some embodiments, the focal plane array 218 can include individual pixel elements arranged into an array such as a focal plane array that defines the detector format and image resolution. Common 4:3 aspect ratio video formats include: 160×120, 320×240, 640×480, 1024×768 and 1280×960. In some embodiments, the focal plane array 218 can be very large square format such as 4096×4096 or 8192×8192. In some embodiments, the focal plane array 218 can include a plurality of focal plane arrays as described further in FIGS. 5A and 5B. In some embodiments, the detector module can include a bias board to provide power for the focal plane array as well as signal conditioning. In some embodiments, the detector module 208 can include a shutter.

The dewar 232 can be any suitable type of container for enclosing the detector module 206 and one or more additional elements in a cold environment. For example, the dewar 232 can be a double-walled vacuum flask with thermal-insulating properties. Additionally, embodiments include a cooling device 230 within the dewar 232. The cooling device 230 can operate to maintain a low temperature inside the dewar 232, and can thereby cool the detector module 206 and/or any other elements inside the dewar 232.

In embodiments where the detector module 206 is designed to image infrared light, cooling the detector module 206 can allow it to function properly. Additionally, it can be advantageous to lower the temperature of lenses and other optical elements so that they do not emit background noise radiation. As mentioned above, it is advantageous in some embodiments to position the transparent plate 242 near an exit pupil so that a small transparent plate 242 can be used. Additionally, it is advantageous to place the transparent plate 242 outside of the dewar 232 so that the temperature and stability of the components inside the dewar 232 are not disturbed by the transparent plate 242 and/or actuator 214. Thus, it is further advantageous to place one or more lenses inside the dewar 232, as this can cause the exit pupil to be located outside of the dewar 232, instead of the exit pupil being located inside the dewar 232 or at the optical opening of the dewar 232 (as is common in infrared imaging systems). As a result, the transparent plate 242 can then be situated both near the exit pupil and outside the dewar 232.

The controller 208 can include one or more processors 220 and memory 222 to control the focal plane array 218 and the actuator 214. The controller 208 can be communicatively coupled to the focal plane array 218 to provide sensor clocking and image processing of sensor data collected by the focal plane array 218. The controller 208 can also be communicatively coupled to the actuator 214 to provide positioning signals to rotate the transparent plate 242 for backscanning. The positioning signals can be proportional to a rotation rate associated with the backscan.

In some embodiments, the controller 208 can determine a rotation rate that is proportional to the aircraft or satellite ground velocity and causes the transparent plate backscan to match the motion of an image during image collection. The controller 208 can include one or more sensors to determine a travel velocity of the camera body 202. The travel velocity of the camera body 202 can be associated with the aircraft or satellite ground velocity. The one or more sensors can include, for example, positioning sensors, accelerometers, magnetometers, and the like. In some embodiments, the controller 208 can be communicatively coupled to the I/O module 210 and determine the travel velocity of the camera body 202 based on data received from the I/O Module 210. In other embodiments, the rotation rate can be pre-programmed based on a predetermined orbit velocity, such as a low earth orbit velocity.

After determining the travel velocity of the camera body 202, the rotation rate and direction can be determined using a control algorithm such that the image smear caused by an image sensor with a long time constant can be reduced or eliminated. The control algorithm can use the travel velocity of the camera body 202 to determine a forward platform velocity associated with the motion of an aircraft or satellite. The control algorithm can determine a rotation rate and rotation direction for the transparent plate that will cause backscanning at a rate that compensates for the forward platform velocity. In some embodiments, the transparent plate is rotated within a plane defined by the direction of the platform movement.

As used herein, the controller 208 can include one or more processors, which can be implemented as one or more integrated circuits (e.g., a microprocessor or microcontroller), to control the operation of the actuator 214 and/or the focal plane array 218. The one or more processors can be implemented as a special purpose processor, such an application-specific integrated circuit (ASIC), which may be customized for a particular use and not usable for general-purpose use. In some implementations, an ASIC may be used to increase the speed of image processing. In some embodiments, the controller 208 can include one or more field programmable gate arrays (FPGAs). The FPGAs can be configured to process sensor data collected by the focal plane array 218. One or more processors, including single core and/or multicore processors, can be included in controller 208. In some embodiments, the controller 208 can be outside the camera body 202. In these embodiments, the focal plane array 218 and the actuator 214 can be communicatively coupled to the I/O module 210.

The I/O module 210 can be configured to send and receive data with external systems communicatively coupled to the imaging system 200. The imaging system 200 can be positioned in a vehicle such as an airplane, satellite, and the like. The data sent and received to and from external systems can include velocity, position, temperature, and the like. In some embodiments, the I/O module can transmit sensor data collected by the focal plane array 218 and/or the controller 208 to one or more systems on the vehicle. I/O module 210 can include device controllers, one or more modems, USB® interfaces, radio frequency transceiver components, a serial bus, and the like to send and receive data.

Figure 2B:
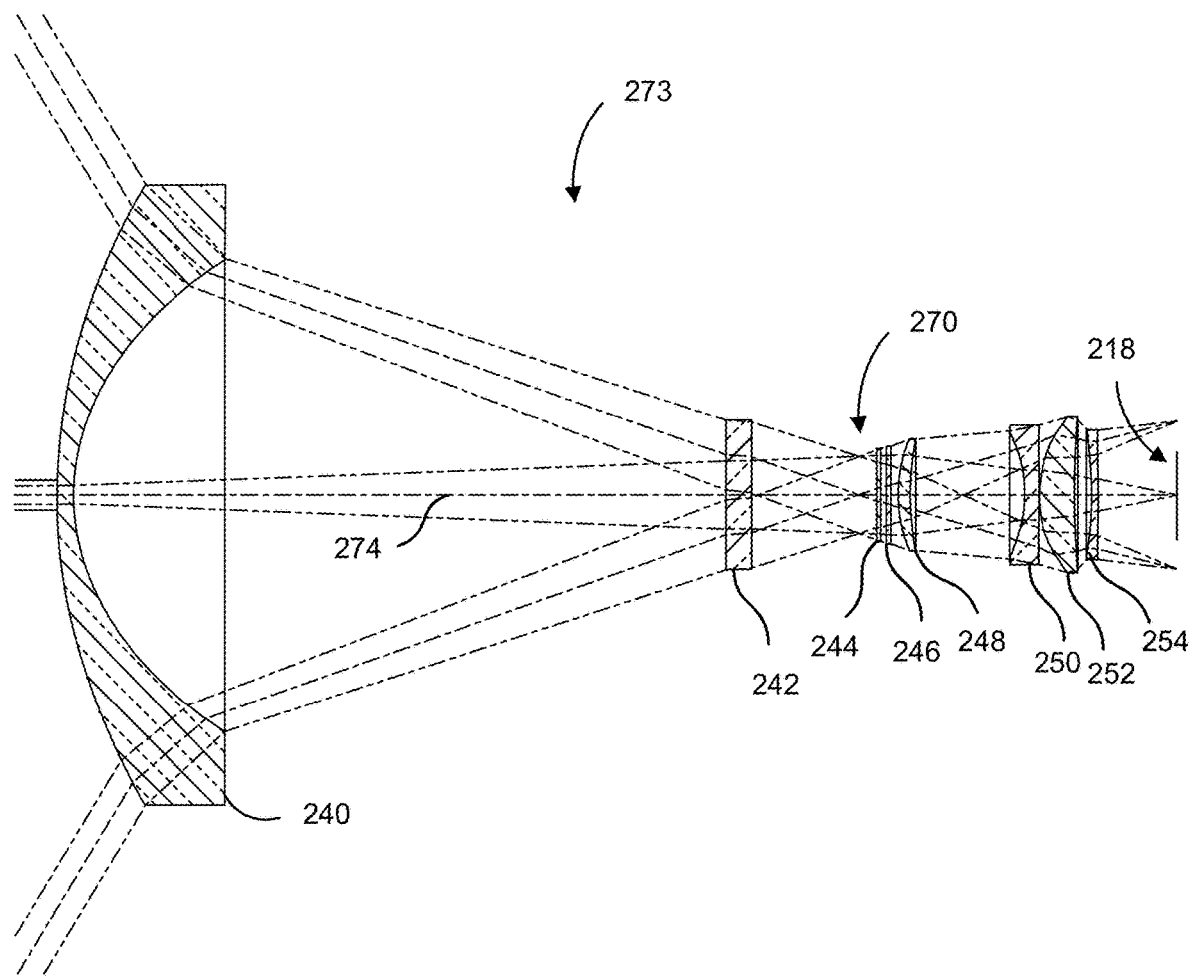
FIG. 2B illustrates an imaging system configured to backscan a transparent plate by rotating the transparent plate during motion of the imaging system according to another embodiment of the present invention.

FIG. 2B illustrates an imaging system 273 configured to backscan a transparent plate by rotating the transparent plate during motion of the imaging system according to another embodiment of the present invention. In the embodiment illustrated in FIG. 2B, optical elements 240 through 254 illustrated in FIG. 2A are illustrated as optical elements 240 through 254 are also illustrated in FIG. 2B. In addition, other elements illustrated in FIG. 2A can be utilized in conjunction with the optical elements illustrated in FIG. 2B and the description provided in relation to FIG. 2A is applicable to FIG. 2B as appropriate. Optical axis 274 passes through the optical center of the imaging system.

Referring to FIG. 2B, objective lens 240, which can be a large outer lens, a window 244 placed at an optical opening into dewar (now shown), a band-pass filter 246, a first lens 248, a second lens 250, a third lens 252, and a fourth lens 254 are illustrated. Together, the lenses (e.g., 240, 248, 250, 252, and 254) can form an inverse telephoto lens system. The band-pass filter 246 can be designed to be transparent for a specific range of electromagnetic radiation. For example, in some embodiments, the band-pass filter 246 may pass some or all wavelengths of infrared light. In one example, the band-pass filter 246 may allow wavelengths in the range of 2.7 µm-4.4 µm to pass.

In the embodiment illustrated in FIG. 2B, the transparent plate 242 and the objective lens 240 are positioned outside the dewar (not shown). Accordingly, the set of lenses 248, 250, 252, and 254 can be referred to as a rear lens group since they are disposed inside the dewar. As illustrated in FIG. 2B, the transparent plate 242 is positioned in front of (i.e., optically upstream of) exit pupil 270. The positioning the transparent plate 242 between the exit pupil 270 and objective lens 240 in between the rear lens group and the objective lens enables wide angle field of view operation in the illustrated embodiment. In FIG. 2B, exit pupil entrance pupil 270 is also the aperture stop of the imaging system.

Although illustrated schematically as a flat or planar optical element with planar and parallel sides, the transparent plate 242 can have curvature in one or both surfaces, resulting in a transparent plate that has either positive or negative optical power.

Figure 9:
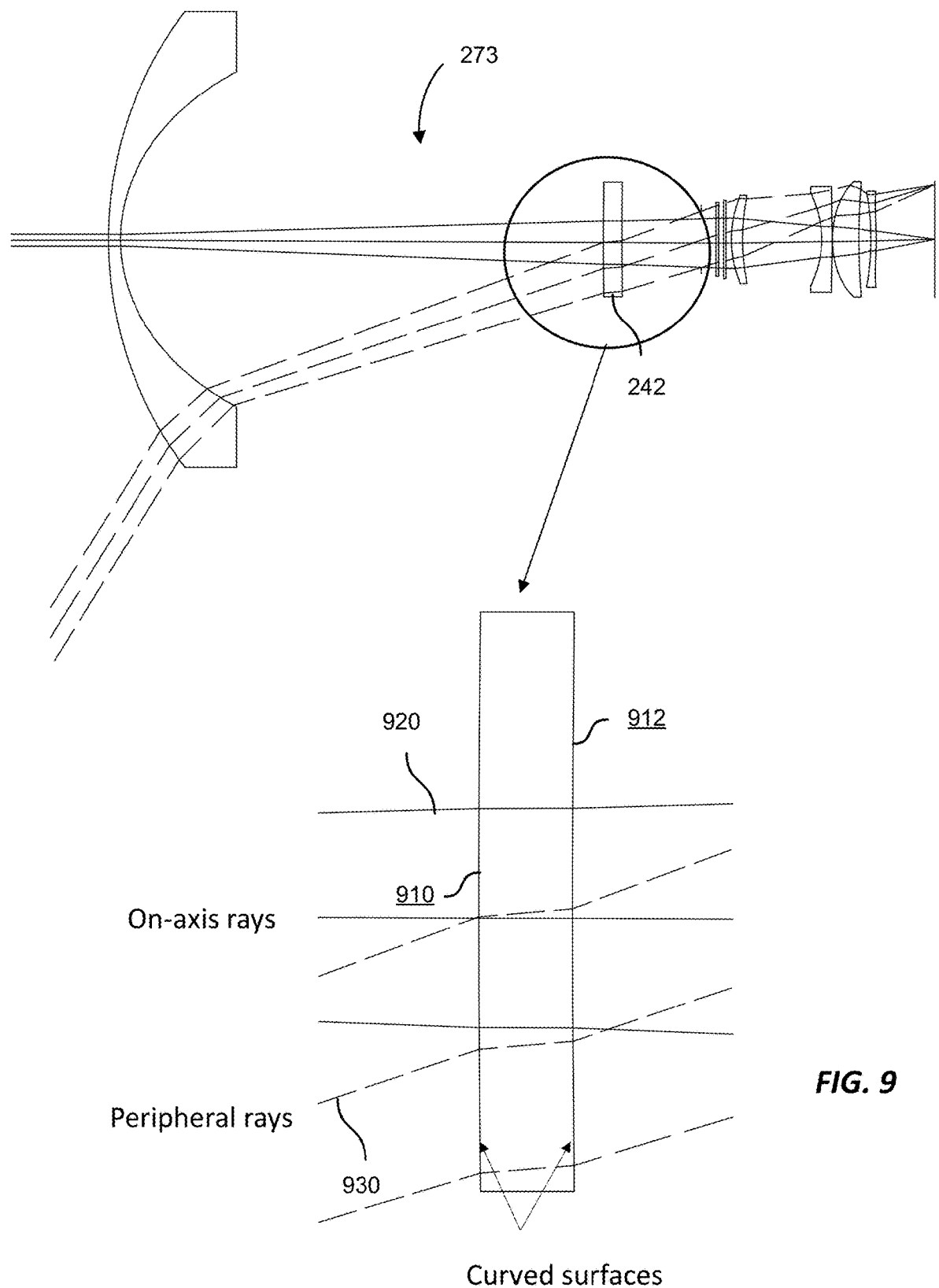
FIG. 9 is a simplified schematic diagram illustrating a transparent plate utilized in some embodiments of the present invention.

FIG. 9 is a simplified schematic diagram illustrating a transparent plate utilized in some embodiments of the present invention. Referring to FIG. 9, imaging system 273 illustrated in FIG. 2B is shown along with additional details related to transparent plate 242 in a particular embodiment. Transparent plate 242 includes two opposing curved surfaces 910 and 912. On axis rays 920 and peripheral rays 930 are illustrated along with the different angles of refractions associated with on axis rays 920 and peripheral rays 930, respectively. As illustrated in FIG. 9, on axis rays 920 experience little refraction at the interfaces defined by curved surface 910 and curved surface 912. For these rays, the paraxial approximation is applicable. In contrast for peripheral rays 930, illustrated by dashed lines, the high angle of incidence results in significant refraction at the interfaces defined by curved surface 910 and curved surface 912. For the high angle of incidence rays, the paraxial approximation may not apply. Accordingly, in contrast with a planar optical element in which rays that impinge on the planar transparent plate at large angles of incidence travel a greater distance through the transparent plate than rays that are on-axis, the transparent plate with curvature illustrated in FIG. 9 provides different plate thicknesses as a function of the radial dimension. Accordingly, curvature of the transparent plate can vary the thickness laterally, introducing a prism or wedge effect and compensating for the different angles of incidence (particularly at high angles of incidence in which the paraxial approximation is no longer valid, which is applicable for the wide field of view systems discussed herein, which may have a field of view of 118°) and the differing optical path lengths that would otherwise result. Thus, differing impacts of the refraction process as a function of the field of view are compensated for by curvature, contributing to the linearity in pixel shift as a function of rotation angle discussed more fully below. Moreover, according to embodiments of the present invention, both the curvature and the tilt can vary as a function of the position across the transparent plate.

As an example, a spherical curvature could be implemented on one or both surfaces of the transparent plate, for example, a curvature of 1.662 m. As will be evident to one of skill in the art, the curvature of one or more of the surfaces of the transparent plate can vary as a function of the position of the transparent plate along the optical axis. For example, at positions closer to the objective lens, the curvature will 1.465 m, whereas, at positions closer to the rear lens group, the curvature will 1.731 m. Likewise, the rotation of the plate can vary as a function of position of the transparent plate along the optical axis. For example, at positions closer to the objective lens, the tilt will be 1.876 degrees, whereas at positons closer to the rear group, the tile will be 2.876 degrees.

Using embodiments of the present invention, substantial linearity can be provided between angular rotation of the transparent plate 242 and shifting of pixels on the focal plane array 218 or other camera disposed at the image plane. In other words, the lateral shifting of pixels in the image is constant or substantially constant as a function of position in the image for a given rotation of the transparent plate 242. Accordingly, by scanning transparent plate 242 at a constant angular rate, constant motion of camera body 202 can be compensated. Thus, linearity is provided in relation to angular rotation of transparent plate 242 and pixel position on the camera. As an example, referring to FIG. 3, as transparent plate 242 is rotated by a given amount, the relationship between pixels is maintained, preventing distortion of the image of the object on the ground 312.

Figure 2C:
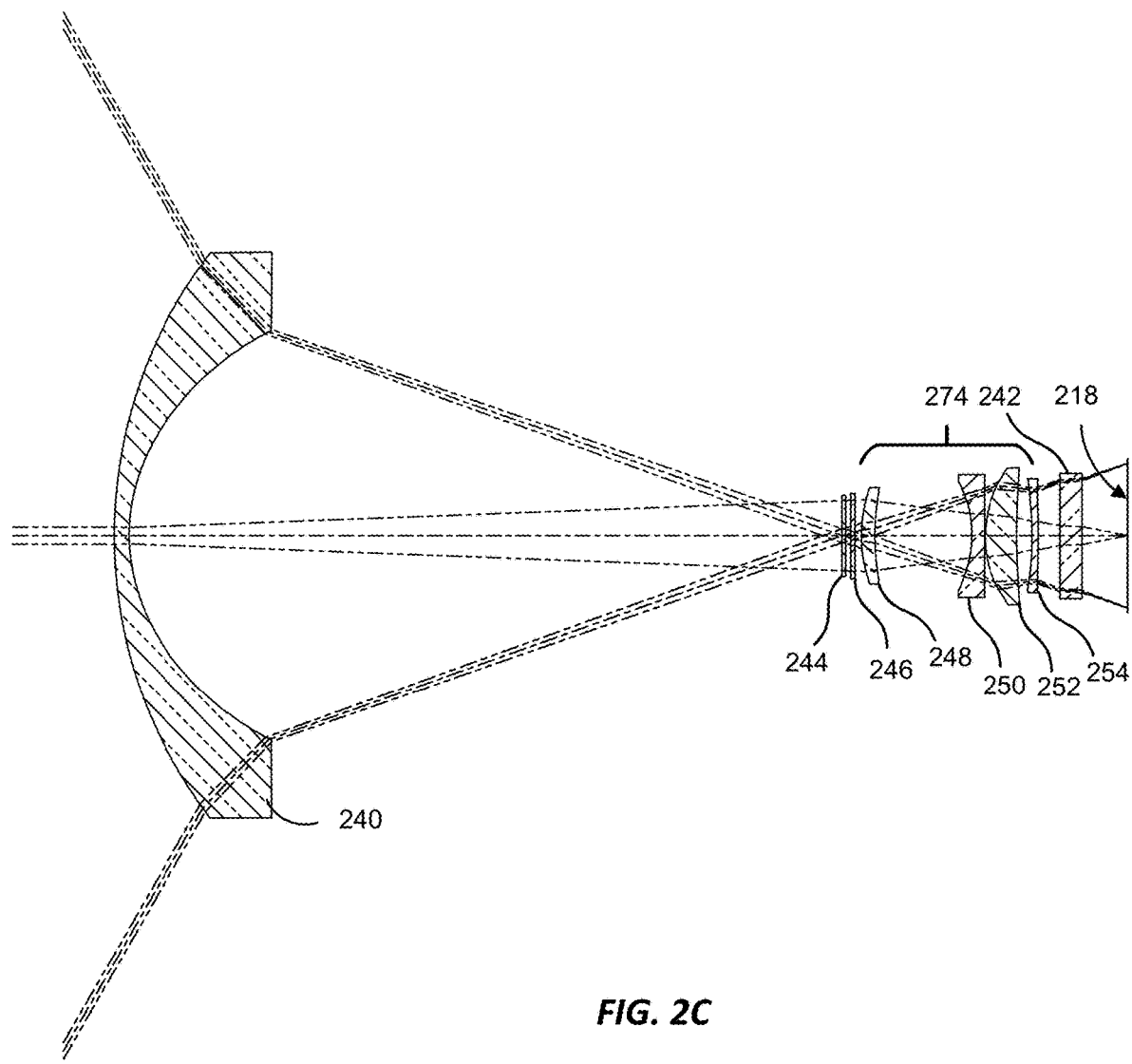
FIG. 2C illustrates an imaging system configured to backscan a transparent plate by rotating the transparent plate during motion of the imaging system according to yet another embodiment of the present invention.

FIG. 2C illustrates an imaging system configured to backscan a transparent plate by rotating the transparent plate during motion of the imaging system according to yet another embodiment of the present invention. In the embodiment illustrated in FIG. 2C, optical elements 240 through 254 illustrated in FIG. 2A are also illustrated in FIG. 2C. Thus, the various elements illustrated in FIG. 2A can be utilized in conjunction with the optical elements illustrated in FIG. 2C and the description provided in relation to FIG. 2A is applicable to FIG. 2C as appropriate.

In the embodiment illustrated in FIG. 2C, transparent plate 242 is positioned between the rear lens group 274, i.e., the set of lenses 248, 250, 252, and 254, and focal plane array 218. This position between lens 254 and focal plane array 218 can be utilized in designs with sufficient working distance and can produce a uniform shift in pixels as the transparent plate is rotated as the ray bundles pass through the transparent plate at different locations. Locating the transparent plate between the focal plane array and the last lens of the rear lens group (i.e., lens 254) can result in a transparent plate with smaller physical extent and hence smaller mass. This in turn would require less force/energy to drive the transparent plate than in other configurations. Additionally, the ray bundles associated with each pixel element across the focal plane array are characterized by a greater separation, resulting in the rays for each pixel passing equally through the full extent of the plate. As described herein, proper placement of the transparent plate enables the rays for each pixel go through a different region of the transparent plate, with increased separation, resulting in an increase in the amount of shift that can be obtained uniformly.

Thus, the transparent plate 242 can be positioned at several different positions along the optical axis according to various embodiments of the present invention, including at the exit pupil as illustrated in FIG. 2A, in front of the exit pupil as illustrated in FIG. 2B, or behind the exit pupil as illustrated in FIG. 2C in which the transparent plate is adjacent the focal plane array.

As described and illustrated herein, embodiments of the present invention provide a substantially uniform pixel shift across a wide field of view image by rotation of the transparent plate. Without limiting embodiments of the present invention, the inventors believe that curvature in one or more surfaces of the transparent plate, as well as location of the transparent plate at a position along the optical axis at which rays from different portions of the wide field of view image pass through different portions of the plate. In embodiments where the transparent plate is located at the exit pupil (for example, the embodiment illustrated in FIG. 2A) it may be difficult to obtain a uniform shift despite curvature in the transparent plate for wide field of view images or images characterized by a large lateral shift in position, however, this embodiment may provide performance within desired target ranges for limited field of view images or limited shift in image position. The embodiments illustrated in FIGS. 2B and 2C enable high levels of performance for large field of view images and/or large image shifts since the transparent plate is positioned at a location along the optical axis at which rays from different points in the scene pass through different sections of the transparent plate. With ray bundles originating at different locations in the scene passing through different regions of the plate, the plate can be shaped to compensate and create a uniform shift for large field of view images and/or large image shifts.

Figure 3:
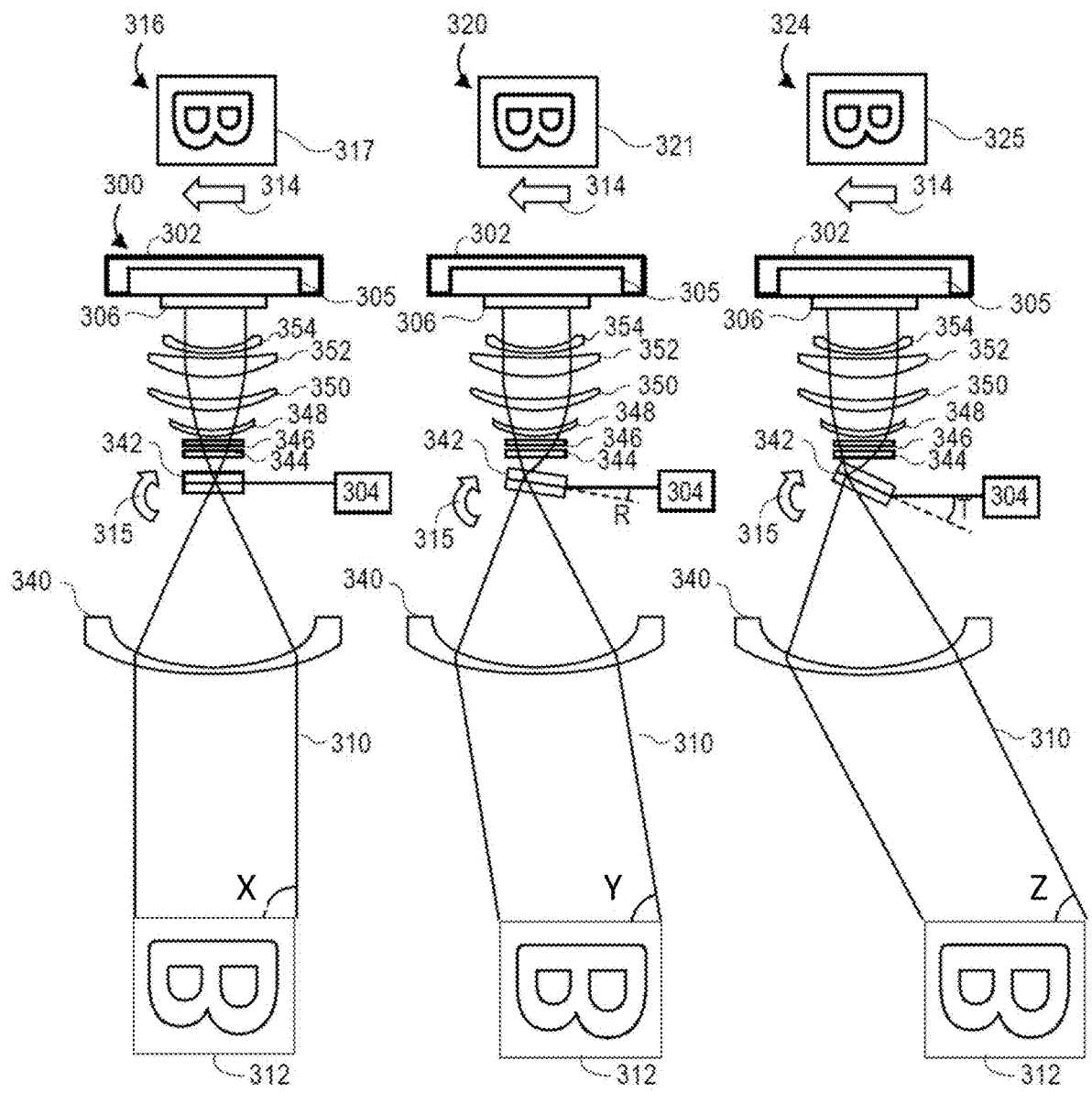
FIG. 3 illustrates three successive frames captured to make a "snap" using an imaging system with a transparent plate that is backscanned at a velocity that corresponds to and cancels the velocity of the camera body relative to the scene, according to an embodiment of the present invention.

FIG. 3 illustrates three successive frames captured using an imaging system with a transparent plate that is backscanned at a rotation rate that matches the travel velocity of the camera body according to an embodiment of the present invention. The imaging system 300 includes a detector module 302, an actuator 304, a stage 305, a focal plane array 306, and a number of optical components such as a transparent plate 342 and several lenses (e.g., 340, 346, 348, 350, 352, and 354). In some embodiments, the imaging system 300 can be mounted in a moving vehicle such as a satellite, an aircraft, an automobile and the like. FIG. 3 also illustrates the rays 310 associated with an object on the ground 312.

In FIG. 3, the imaging system 300 is moving at a travel velocity 314 over the object on the ground 312. In a first frame 316, the rays 310 associated with the object on the ground 312 are arriving at the imaging system 300 at an angle X. In the example shown in FIG. 3, this angle X is approximately 90 degrees, such that the rays 310 are arriving from directly below, and such that the first position of the transparent plate 342 is oriented straight ahead (e.g., not rotated). As a result, the rays 310 are centered on the focal plane array 306 and a first image 317 on the focal plane array 306 shows the object on the ground 312.

For a second frame 320, the imaging system 300 has moved relative to the object on the ground 312 due to the velocity 314 of the imaging system 300. As a result, the rays 310 associated with the object on the ground 312 are now arriving at the imaging system 300 at an angle Y. As shown in FIG. 3, this angle Y is now less than 90 degrees (e.g., 89.9 degrees) such that the rays 310 arrive from a position shifted slightly to the side instead of from directly below. In the embodiment illustrated in FIG. 3, a controller, such as controller 208 described in FIG. 2A, causes the actuator 304 to rotate the transparent plate 342 (which can also be referred to as backscanning) at a rotation rate 315 corresponding to the travel velocity 314. The rotation rate 315 causes the transparent plate 342 to rotate continuously so that the transparent plate 342 passes through a second position during the second frame. The second position of the transparent plate 342 is an angle R relative to the first position of the transparent plate 342. The rotation rate 315 and angle R are chosen such that, when the rays 310 arrive at the angle Y, the transparent plate 342 shifts the rays 310 to arrive at the same position on the focal plane array 306 as they did in the first frame 316. Accordingly, a second image 321 on the focal plane array 306 is in the same position as the first image 317 on the focal plane array 306.

For a third frame 324, the imaging system 300 has moved further relative to the object on the ground 312 due to the travel velocity 314 of the imaging system 300. As a result, the rays 310 associated with the object on the ground 312 are now arriving at the transparent plate 342 at an angle Z. As shown in FIG. 3, this angle Z is now less than the previous angle Y such that the rays 310 are arrive from further to the side (e.g., at 89.8 degrees). The controller causes the actuator 304 to rotate the transparent plate 342 at the rotation rate 315 corresponding to the travel velocity 314 and the current angle of the transparent plate. The rotation rate 315 causes the transparent plate 342 to rotate continuously so that the transparent plate 342 passes through a third position during the third frame. The third position of the transparent plate 342 is an angle T relative to the first position of the transparent plate 342. The rotation rate 315 and angle T are chosen such that, when the rays 310 arrive at the angle Z, the transparent plate 342 shifts the rays 310 to arrive at the same position on the focal plane array 306 as in the first frame 316 and the second frame 320. Accordingly, a third image 325 on the focal plane array 306 is in the same position as the first image 317 and the second image 321 on the focal plane array 306.

As illustrated in the first image 317, the second image 321, and the third image 325, the drive velocity can be configured to rotate the transparent plate 342 to stabilize the image on the focal plane array 306. As a result, no image smearing occurs. If an integrated image of the object on the ground 312 was produced from the integration of the first image 317, the second image 321, and the third image 325 with backscanning via rotation of the transparent plate 342, the integrated image of the object on the ground 312 will have an improved signal to noise ratio and other quality metrics in comparison to a single image or an integrated image produced from images without backscanning via rotation.

In some embodiments, the actuator 304 can rotate the transparent plate 342 continuously, but with a changing rotation rate 315. For example, the rotation rate 315 can be higher when the transparent plate 342 is oriented at smaller angles (e.g., oriented directly downward or nearly directly downward), and the rotation rate 315 can decrease as the transparent plate 342 is further rotated. This can be a result of translating the primarily linear and horizontal movement of the imaging system 300 relative to the ground to an angular movement of the transparent plate 342.

Additionally, embodiments allow the transparent plate 342 to move through any suitable range of tilt angles, as well as start and finish rotational movement at any suitable angles. The frames in FIG. 3 show the transparent plate 342 starting at angle of zero degrees (e.g., facing directly downward), and then rotating to the right to an angle T (e.g., to an angle of about 75 degrees). However, the transparent plate 342 could have a starting angle that is not zero degrees, and the starting angle could be negative (e.g., to image the ground in front of the imaging system 300) or positive (e.g., to image the ground behind the imaging system 300). For example, the transparent plate 342 can rotate from a starting negative angle, through a zero degree angle, and then finish rotating at a positive angle. Additionally, the transparent plate 342 can be accelerated into the appropriate rotation rate before imaging begins.

Further, the light rays 310 shown in FIG. 3 may not be representative of the entire field of view being imaged. Instead, the light rays 310 may only be representative of the nadir section of the image. The total field of view being imaged can be larger than shown, such as a 120 degree viewing angle, thereby providing a field of view of 120 degrees.

Although the description in FIG. 3 utilizes the optical layout illustrated in FIG. 2A, in which the transparent plate 342 is positioned at or near an exit pupil, embodiments of the present invention are not limited to this implementation and other optical layouts can be utilized. For example, the optical layout illustrated in FIG. 2B in which transparent plate 242 is positioned between the objective lens and the exit pupil, as well as the optical layout illustrated in FIG. 2C in which the transparent plate 242 is positioned adjacent the focal plane array and optically downstream of the rear lens group can be utilized according to embodiments of the present invention. Thus, a variety of positions of the transparent plate are possible using embodiments of the present invention. Moreover, embodiments of the present invention are not limited to the use of a single transparent plate to backscan the image via rotation of the transparent plate and multiple transparent plates working in concert, each being rotated an appropriate angular rate, which can be different for each of the multiple transparent plates, can be utilized to accomplish the image backscanning illustrated herein. One of ordinary skill in the art would recognize many variations, modifications, and alternatives.

It should be noted in reference to FIG. 3 that although the examples illustrated and discussed in FIG. 3 are based on a change in the angle of the transparent plate that is referenced to a plane parallel to the focal plane array 306 and normal to the optical ray bundle, i.e., the plane orthogonal to the optical axis 274 illustrated in FIG. 2B, this is not required by the present invention. In addition to operation relative to or with respect to the plane parallel to the focal plane array, the transparent plate could be rotated relative to other planes. Moreover, the transparent plate could be rotated in the opposite direction to that illustrated in FIG. 3, such that the transparent plate would be rotated from a negative to a positive angle change to shift the image in the plane of the focal plane array. One of ordinary skill in the art would recognize many variations, modifications, and alternatives.

Figures 4A, 4B:
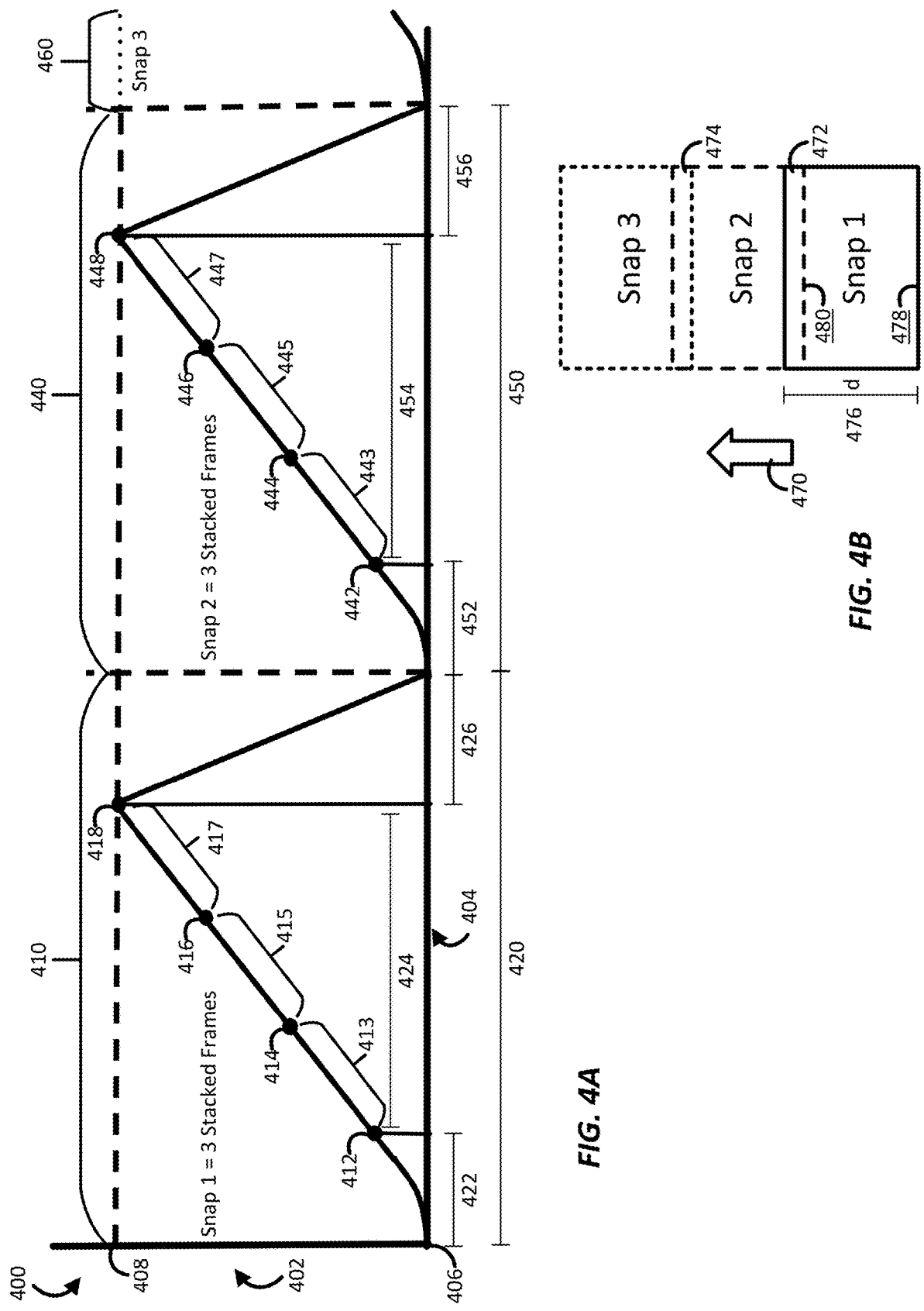
FIG. 4A illustrates two full cycles of capturing consecutive image frames with a transparent plate rotating at a velocity that compensates for the velocity of the camera body, according to an embodiment of the present invention.
FIG. 4B illustrates the overlap between snaps, according to an embodiment of the present invention.

FIG. 4A illustrates two full cycles of capturing consecutive image frames with a transparent plate rotating to achieve a backscan relative to the travel velocity of the camera body according to an embodiment of the present invention. The plot 400 illustrates a sawtooth motion profile of the rotational movement of the transparent plate generated by the control algorithm. In some embodiments, the control algorithm automatically adjusts the rotation rate and rotation direction of the transparent plate so that it corresponds to the travel velocity of the image sensor relative to the earth's surface. The plot 400 shows the transparent plate angle position 402 along the y-axis and the time 404 along the x-axis. A starting position 406 is at zero degrees (or at any other suitable angle) and a final position 408 is in a position based on a rotational range of the transparent plate and a length of the snap period. In some embodiments, the final transparent plate angle position is determined by the shorter of the rotational range and the length of the snap period.

FIG. 4A includes three snap periods, a first snap period 410, a second snap period 440, and a third snap period 460. The first snap period 410 includes capturing a first frame 413 when the transparent plate is moving from a first angle position 412 to a second angle position 414, a second frame 415 when the transparent plate is moving from the second angle position 414 to a third angle position 416, and a third frame 417 when the transparent plate is moving from the third angle position 416 to a fourth angle position 418. The frames are captured during a total exposure time 424 associated with the first snap period 410, which has a total movement cycle period of 420. The exposure duration for each frame depends on the saturation time of the image sensor. In an example embodiment, the frames can be captured at a rate of 30 frames per second. The resulting maximum exposure time is 33.3 milliseconds per frame, or 100 milliseconds for the three frame total exposure time.

The rotation rate of the transparent plate during the first snap period 410 can be divided into three time segments. The first time segment 422 is associated with a period of time for the actuator to accelerate and cause the transparent plate to reach a determined initial velocity and/or starting angle. The starting angle can be an angle at which the next intended ground image area is in view and stationary on the focal plane.

The second time segment 424 is associated with a period of time where the actuator is causing the transparent plate to tilt at a rotation rate (or a range of rotation rates) corresponding to the velocity of the camera body and/or the angle position of the transparent plate. The rotation rate opposes the motion of the image plane caused by the travel velocity of the camera body. The velocity of the camera body can correspond to motion of a platform in which the camera body is placed or mounted. A platform can include, for example, a satellite, an airplane, and the like. During the second time segment 424, an image is stabilized on the focal plane and frames can be stacked together with no image smear or blur. In some embodiments, if the image sensor will not be saturated, a single, continuous frame can be captured for the duration of the second time segment 424. In some embodiments the sensor can operate at a higher frame rate and more than 3 frames can be stacked during the second time segment 424.

The third time segment 426 is associated with a period of time required for the actuator to move the transparent plate from the final angle position 418 back to the starting angle position 406. In some embodiments, the third time segment can be considered the reset time.

The second snap period 440 includes capture of a first frame 443 when the transparent plate is moving from 442 to 444, a second frame 445 when the transparent plate is moving from 444 to 446, and a third frame 447 when the transparent plate is moving from 446 to 448. The frames are captured during a total exposure time 454 associated with the second snap period 440, which has a total movement cycle period of 450.

The rotation rate of the transparent plate during the second snap period 440 can be divided into three time segments. The first time segment 452 is associated with a period of time for the actuator to accelerate and cause the transparent plate to reach a determined initial velocity and/or starting angle. The starting angle can be an angle at which the next intended ground image area is in view and stationary on the focal plane. The second time segment 454 is associated with a period of time where the actuator is causing the transparent plate to rotate at a rotation rate (or a range of rotation rates) corresponding to the velocity of the camera body and/or the angle position of the transparent plate. During the second time segment 454, an image is stabilized on the focal plane and frames can be stacked together with reduced or no image smear or blur. The third time segment 456 is associated with a period of time required for the actuator to move the transparent plate from the final angle position 418 back to the starting angle position 406.

For simplicity, the third snap period 460, as shown in FIG. 4A, is shortened but includes three stacked frames similar to the first snap period 410 and the second snap period 440. The rotation rate of the transparent plate during the second time segments 424 and 454 can correspond to a current transparent plate position and/or a travel velocity associated with the controller 208 described in FIG. 2A. In some embodiments, a stabilization period can be inserted between the third time segment 426 of first snap period 410 and the first time segment 452 of the second snap period 440.

FIG. 4B illustrates the overlap between snaps according to an embodiment of the present invention. Snap 1, snap 2, and snap 3 are shown along the direction of travel along the ground 470. The first snap overlap 472 and the second snap overlap 474 provide for a continuous strip image associated with one or more focal plane arrays on a focal plane. A field of view of the imaging system captures an image with a dimension 476, d, that corresponds to a distance parallel to the direction of travel along the ground 470. The time for a trailing edge 478 of snap 1 to travel a across a scene captured by snap 1 and reach a first edge 480 of the first snap overlap 472 corresponds to the time available for the actuator to reset the transparent plate to the starting position 406. Each snap can include three frames and can use frame stacking to improve the signal to noise ratio of the resulting snap. White noise from the detector array improves with multiple frames added together; the SNR benefit corresponds to the square root of the number of frames stacked. Longer duration backscanning of the transparent plate or operating the sensor with a higher frame rate results in a greater number of frames per snap and improved SNR of the resulting snap image.

FIG. 5A illustrates a focal plane array configuration consisting of 5 stagger butted focal plane arrays on a stage according to an embodiment of the present invention. The imaging system 500 includes a focal plane array configuration 502, a first staring focal plane array 504, a second staring focal plane array 506, a third staring focal plane array 508, a fourth staring focal plane array 510, and a fifth staring focal plane array 512, and thermal strapping 514. Each focal plane array can include one or more spectral filters. In some embodiments, the focal plane array configuration 502 can be coupled to a stage as described in FIG. 2A. In some embodiments, each focal plane array can capture images according to the cycles illustrated in FIGS. 4A and 4B.

FIG. 5B illustrates the ground swath width 550 of a scan associated with 5 stagger butted focal plane arrays according to an embodiment of the present invention. In some embodiments, referring to FIGS. 5A and 5B, the focal plane arrays can be staggered and butted to eliminate dead areas in a scan generated by focal plane array configuration 502. For example, the first staring focal plane array 504 and the second staring focal plane array 506 are aligned together and staggered from the third staring focal plane array 508, the fourth staring focal plane array 510, and the fifth staring focal plane array 512. The direction of satellite motion 516 will capture a strip of images corresponding to each focal plane array. For example, the first staring focal plane array 504 can correspond to a first strip 524, the second staring focal plane array 506 can correspond to a second strip 526, the third staring focal plane array 508 can correspond to a third strip 528, the fourth staring focal plane array 510 can correspond to a fourth strip 530, and the fifth staring focal plane array 512 can correspond to a fifth strip 532. Each strip can consist of a plurality of snaps and each snap can correspond to a plurality of frames as illustrated in FIGS. 4A and 4B. The snap dimensions perpendicular to the direction of motion form the ground swath width 550.

While FIGS. 5A and 5B illustrate an imaging system 500 with five focal plane arrays, according to some embodiments of the present invention, an imaging system can include 10 focal plane arrays, with up to 12 spectral filters. Other embodiments can include many focal plane arrays with many spectral filters. Moreover, a single focal plane array can be utilized in some embodiments, accordingly, five focal plane arrays are not required and a fewer number can be utilized. One of ordinary skill in the art would recognize many variations, modifications, and alternatives.

Figure 6A:
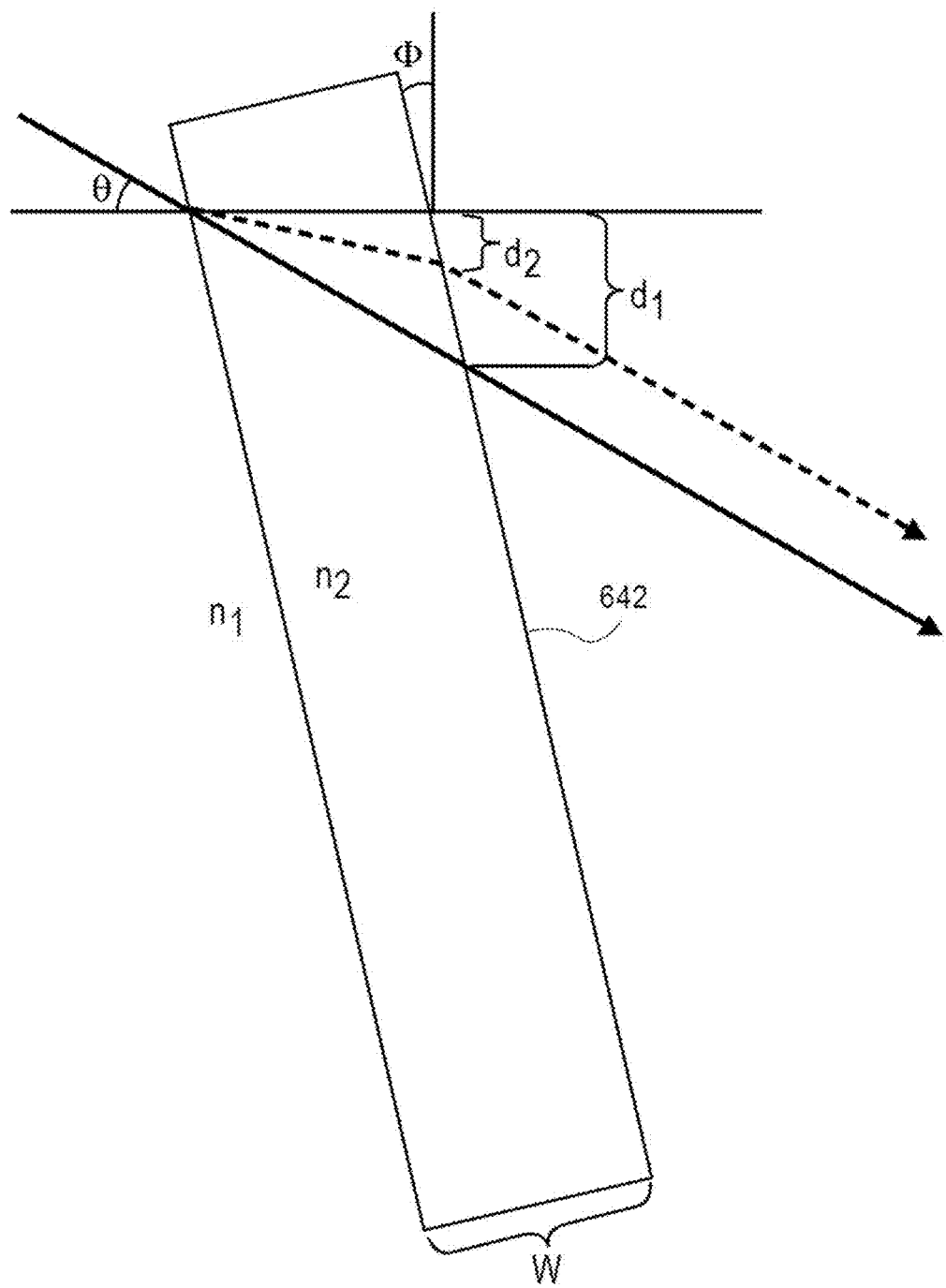
FIG. 6A illustrates an example of a transparent plate laterally shifting an incoming light ray, according to an embodiment of the present invention.

FIG. 6A provides an example illustration of a transparent plate 642 shifting an incident light ray. The transparent plate 642 can have parallel outer surfaces, and can have an index of refraction that is different that the immediate surroundings. As a result, an incident light ray can be refracted upon entering and exiting the transparent plate 642, the entering and exiting angles can be the same. Thus, the transparent plate 642 can shift an incident light ray to the side without changing the angle or direction of the light ray. This can then cause the light ray (and any image it is part of) to shift laterally on an image sensor at the end of the optical path. Further tilting the transparent plate 642 can cause the optical path length of the incident light ray to further increase.

As shown in FIG. 6A, the transparent plate 642 can have a width w, and the transparent plate 642 can be tilted to have a transparent plate angle Ø (e.g., as measured from the plane that is parallel to the detector). A light ray can be incident upon the transparent plate 642 with a light ray angle θ (e.g., as measured from an axis that is normal to the plane of the detector). The air (or other material) around the transparent plate 642 can have a first index of refraction $n_1$ while the transparent plate 642 has a second index of refraction $n_2$. If the indices of refraction were the same, the lateral distance that the light ray would have traveled while within transparent plate 642 is notated as at $d_1$. The actual lateral distance that the light ray travels with within the transparent plate 642 (due to internal refraction) is notated as at $d_2$. Accordingly, the lateral shift of the light ray caused by the transparent plate 642 is $d_2-d_1$. This distance can be defined in terms of the other parameters by using Snell's law. For example, the lateral shift distance of the light ray caused by the transparent plate 642 can be described as:

$$d_2 - d_1 = w\left(\frac{n_1}{n_2 - 1}\right)\sin(\emptyset + \theta)$$

In another embodiment, the lateral shift distance can be described for a rotating transparent plate. In such a scenario, $\emptyset_1$ can represent the starting angle of the transparent plate 642 and $\emptyset_2$ can represent the ending angle of the transparent plate 642. In this case, the lateral shift distance of the light ray caused by the rotating transparent plate 642 can be described as:

$$d_2 - d_1 = w\left[\left(\tan(\emptyset_2 + \theta) - \frac{n_1 \sin(\emptyset_2 + \theta)}{(n_2^2 - n_1^2 \sin(\emptyset_2 + \theta)^2)^{.5} n_2 - 1}\right)\cos(\emptyset_2) - \left(\tan(\emptyset_1 + \theta) - \frac{n_1 \sin(\emptyset_1 + \theta)}{(n_2^2 - n_1^2 \sin(\emptyset_1 + \theta)^2)^{.5}}\right)\cos(\emptyset_1)\right]$$

Figure 6B:
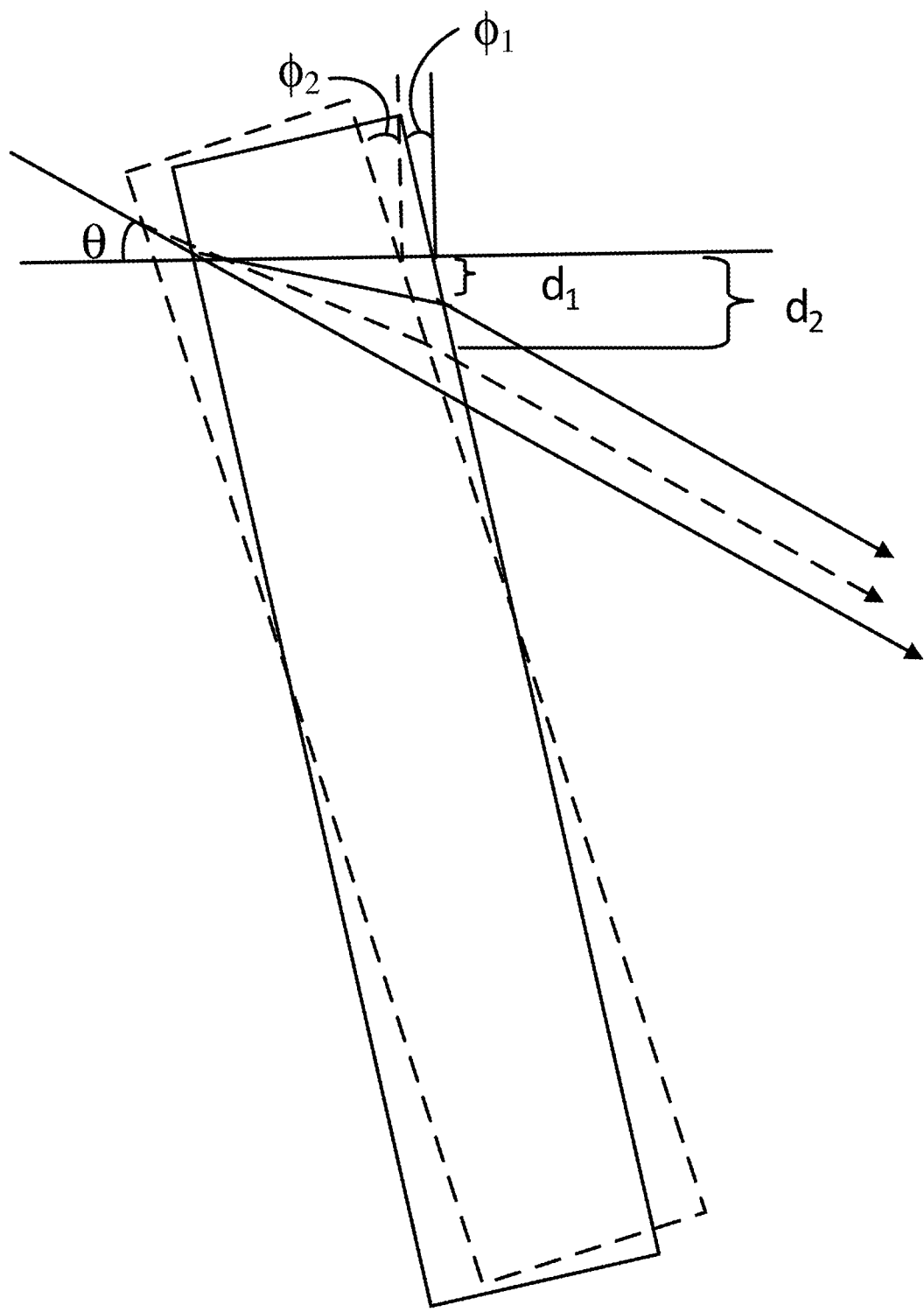
FIG. 6B illustrates an example of a rotating transparent plate laterally shifting an incoming light ray, according to an embodiment of the present invention.

FIG. 6B illustrates an example of the difference in lateral shift caused by a transparent plate between a first rotated position and a second rotated position. As discussed in relation to FIG. 6A, for a tilt angle of $\phi_1$, a lateral shift of $d_1$ is produced. As the tilt angle is increased to an increased tilt angle of $\phi_2$, an increased lateral shift of $d_2$ is produced. Thus, FIG. 6B provides an illustration of the lateral shift distance achieved by rotating the transparent plate at increasing angles as illustrated by the equation above.

Figure 7:
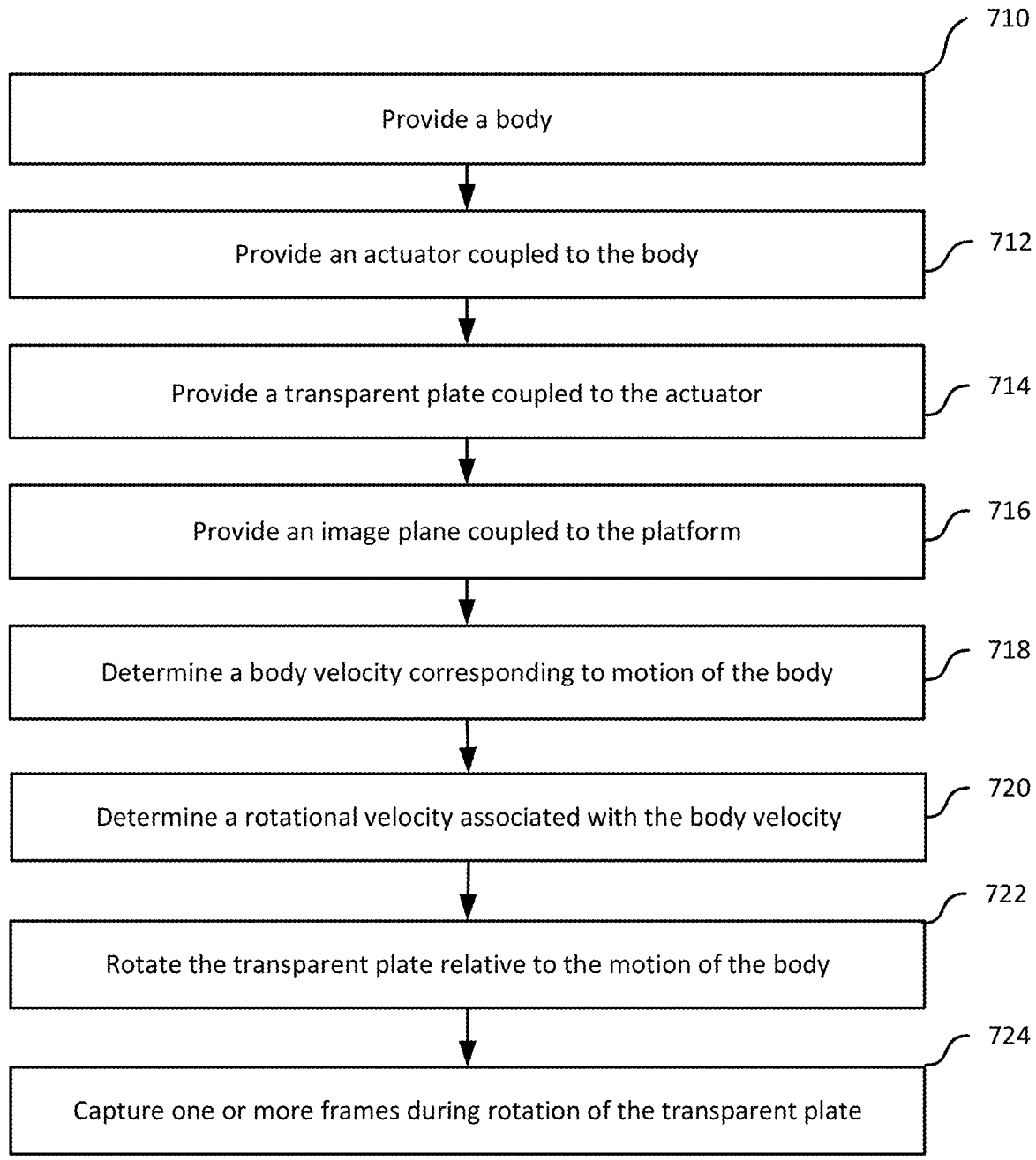
FIG. 7 is a simplified flowchart illustrating a method 700 of rotating a transparent plate to backscan an image during image collection, according to an embodiment of the present invention.

FIG. 7 is a simplified flowchart illustrating a method 700 of rotating a transparent plate to backscan an image during image collection, according to an embodiment of the present invention. At step 710, provide a body. In some embodiments the body is in motion. At step 712, provide an actuator coupled to the body. In some embodiments the actuator can be a piezoelectric actuator. At step 714, provide a transparent plate coupled to the actuator. At step 716, provide a focal plane array coupled to the stage. The focal plane array can include one or more individual focal plane arrays. At step 718, determine a body velocity corresponding to motion of the body. At step 720, determine a rotation rate proportional to the body velocity and/or transparent plate angle position. At step 722, rotate the transparent plate at a rotation rate (e.g., dynamic or static) relative to the motion of the body. At step 724, capture one or more frames during rotation of the transparent plate. In some embodiments, the one or more focal plane arrays can capture the one or more frames.

It should be appreciated that the specific steps illustrated in FIG. 7 provide a particular method of rotating a transparent plate to backscan an image during image collection, for example, during earth observation imaging, according to an embodiment of the present invention. Other sequences of steps may also be performed according to alternative embodiments. Moreover, the individual steps illustrated in FIG. 7 may include multiple sub-steps that may be performed in various sequences as appropriate to the individual step. Furthermore, additional steps may be added or existing steps may be removed depending on the particular applications. One of ordinary skill in the art would recognize many variations, modifications, and alternatives.

Figure 8:
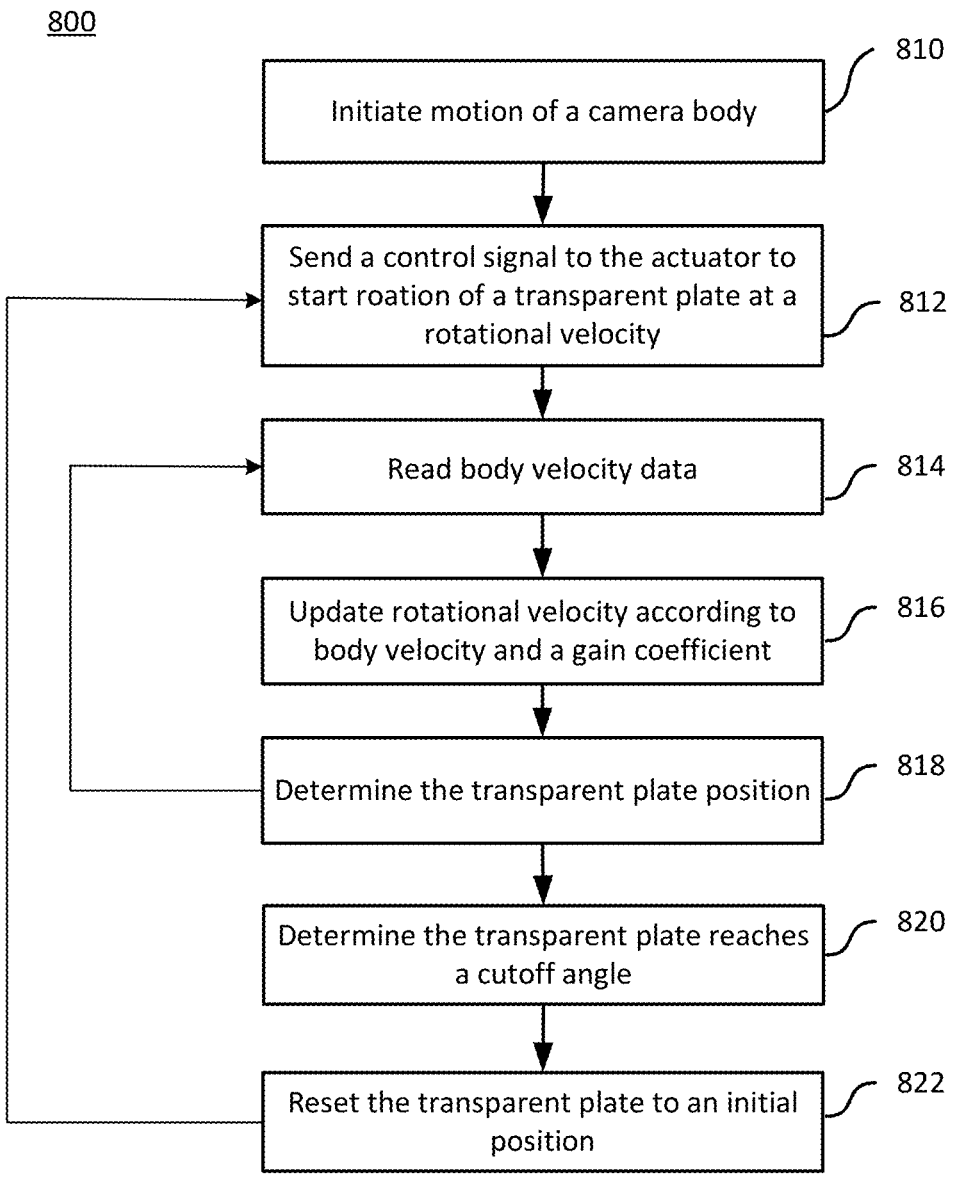
FIG. 8 is a simplified flowchart illustrating a control algorithm 800 for rotating a transparent plate according to an embodiment of the present invention.

FIG. 8 is a simplified flowchart illustrating a control algorithm 800 for rotating a transparent plate according to an embodiment of the present invention. At step 810, initiate motion of a camera body. In some embodiments, the motion of the camera body can be associated with a path along the surface of the earth. The camera body can include one or more lenses, a transparent plate, an actuator, a stage with a focal plane array, a controller, and/or any other suitable elements. In some embodiments, the camera body can include an I/O module. At step 812, send a control signal to the actuator to start a rotation of the transparent plate at a rotation rate (e.g., static or dynamic) and in a rotation direction. In some embodiments, the control signal can include a command to begin capturing images. In some embodiments, the control signal can start/restart a timer associated with the rotation of the transparent plate. At step 814, read body velocity data. Body velocity data can be determined and or received by a processor in the controller. The body velocity data can be read by the processor in the controller. In some embodiments, the body velocity data can indicate that a starting rotation rate and/or starting transparent plate angle has been reached and the controller will send a command to the focal plane array to begin capturing one or more images.

At step 816, update the rotation rate according to the body velocity, the current transparent plate angle, and a gain coefficient. In some embodiments the gain coefficient can be a vector or matrix with multiple terms. The gain coefficient can adjust the rotation rate based on the properties of the image sensor such as image sensor dimensions, actuator characteristics, and focal plane array characteristics. In some embodiments, the gain coefficients can be applied at specific transparent plate angle positions during backscanning via rotation. In some embodiments, the gain coefficients can compensate for hysteresis effects in a piezoelectric actuator to improve rotation rate smoothness. In some embodiments, additional velocity scale factors can be added to address variables specific to a particular implementation.

At step 818, determine the transparent plate angle position. In some embodiments, a processor in the controller can read data from one or more transparent plate position sensors to determine the current angle of the transparent plate. In other embodiments, the transparent plate angle position can be estimated using (e.g., integrating) the rotation rate. In other embodiments, the transparent plate angle position can be extrapolated based on a predetermined time period. At step 820, determine the transparent plate reaches a cutoff angle. The cutoff angle can be associated with a maximum time at the rotation rate or a maximum angle position of the transparent plate and actuator relative to the body. In some embodiments, an extrapolated transparent plate angle position can be used to determine the transparent plate will reach the cutoff angle within the predetermined time period. At step 822, after reaching the cutoff angle, return the transparent plate and actuator to an initial position or state.

It should be appreciated that the specific steps illustrated in FIG. 8 provide a particular method of controlling rotation of a transparent plate during earth observation imaging according to an embodiment of the present invention. Other sequences of steps may also be performed according to alternative embodiments. Moreover, the individual steps illustrated in FIG. 8 may include multiple sub-steps that may be performed in various sequences as appropriate to the individual step. Furthermore, additional steps may be added or existing steps may be removed depending on the particular applications. One of ordinary skill in the art would recognize many variations, modifications, and alternatives.

Embodiments of the invention provide a number of advantages. For example, in some embodiments, a transparent plate can be used to correct for image smearing in high-velocity imaging systems, such as satellites and airplanes. The transparent plate can be rotated to backscan an image area, such that an image remains stationary on a light detector. It is advantageous to backscan using a transparent plate instead of mirrors, as a transparent plate can be a much smaller and discrete piece of equipment, and the total imaging system can become more compact. Thus, embodiments improve the efficiency of imaging systems by reducing the weight, size, and power needs of backscanning components. Reducing the weight of moving components also reduces the inertia created during backscan, which in turn reduces disturbances to the imaging system and noise in the image. Thus, the quality of images can be advantageously improved.

Further, embodiments allow some lenses and other optical elements to be placed inside a cold shielded area (e.g., a dewar), which cools the elements and reduces their emissions of background radiation. This also can result in an exit pupil being moved from a dewar optical opening so that it now is positioned away from the dewar. As a result, the transparent plate can be placed at or near the exit pupil, or between the exit pupil and the dewar. Since the light ray bundle has the smallest diameter at the exit pupil, a small transparent plate can be sufficient for shifting the light ray bundle. Thus, the backscanning hardware can be even further reduced in size.

The above embodiments primarily utilized a transparent plate that is flat. However, other embodiments allow the transparent plate to have some curvature. This can be done for a number of reasons described below.

As described above with respect to FIG. 6A, a flat plate can cause a lateral shift in an incoming light path. The amount of lateral shift when the plate is rotated can be dependent on the incoming angle of the light ray. Light rays that arrive normal (e.g., at a 90 degree angle) will undergo the smallest lateral shift when the plate is rotated, slightly smaller angles (e.g., slightly less than 90 degrees) can undergo slightly more lateral shift, and even smaller angles can undergo a much larger lateral shift. Accordingly, for imaging system with large fields of view where light rays arrive from different angles at the same time, a rotating flat plate could cause light rays at the edge of field of view to shift more. For example, in an optical system where light rays incident on the transparent plate vary from normal to 18 degrees, the variation in shift can across the field of view can be about 18%. As a result, a flat plat can cause image distortion. Thus, while a flat plate can be suitable for narrow fields of view, a flat plate can cause distortion for large fields of view.

Additionally, as the transparent plate tilts, the different light rays across the field of view can interact with the other lenses in the system in a non-uniform manner.

Embodiments of the invention can mitigate and/or eliminate the variation in shift by introducing a small spherical concave curve to the front surface of the transparent plate and a convex curve to the rear surface of the transparent plate as discussed in relation to FIG. 9.

The transparent plate could alternatively be moved closer to the focal plane (e.g., in between the focal plane array 218 and optical element 254) as discussed in relation to FIG. 2C to achieve the same effect. However, this may involve placing the transparent plate inside the dewar (i.e., cold box) along with cooling of the mechanism to hold the transparent plate in the case of an infrared detector.

With the correct combination of transparent plate curvature and location, the lateral shift across the image field of view can be similar within 10% of a pixel size or less. Accordingly, the lateral shift of the image across the field of view can be uniform or near-uniform during rotation, thereby avoiding distortion and making the above-described backscan achievable.

It can be advantageous to use a transparent plate material that has a high index of refraction (or a greater differential in index of refraction relative to the surrounding air or other surrounding material). A higher index of refraction can result in a larger lateral shift. Additionally, a higher index of refraction can further reduce the variation in shift due to angle of incident light.

Figure 10:
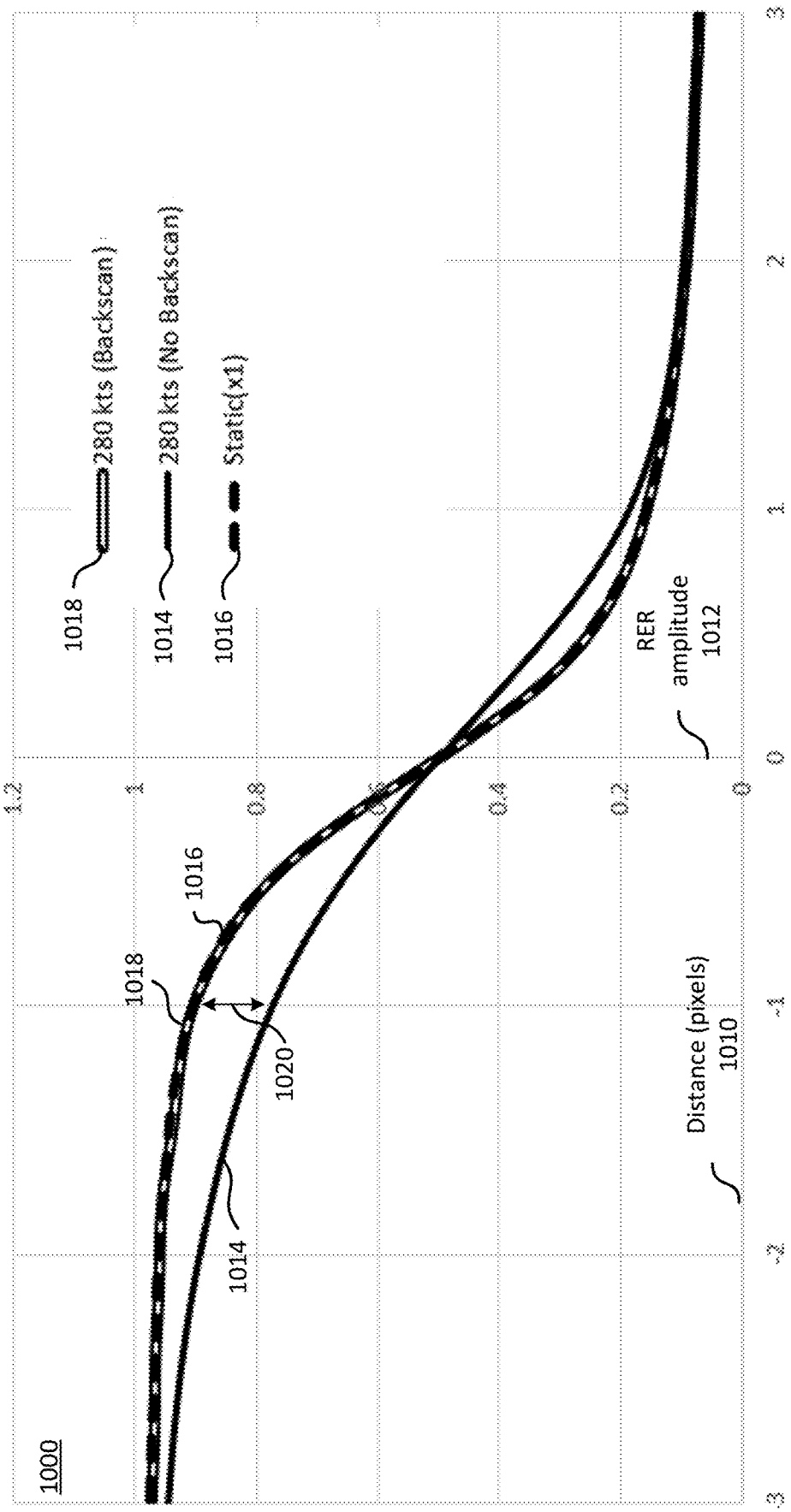
FIG. 10 shows a comparison of relative edge response (RER) for various focal plane array configurations according to embodiments of the present invention.

FIG. 10 shows a comparison of relative edge response (RER) for various focal plane array configurations according to embodiments of the present invention. The plot 1000 illustrates the RER for an image as a function of the distance from the edge. The x-axis 1010 illustrates the distance in pixels from an edge at zero on the x-axis 1010. The y-axis 1012 illustrates the RER amplitude. A first focal plane array configuration is a static focal plane array illustrated by trace 1016 that captures a single frame. The RER of the static focal plane array at the zero pixel is 0.52759.

A second focal plane array configuration is a non-backscanning focal plane array illustrated by trace 1014. The second focal plane array configuration is mounted on a test vehicle that simulates motion of the non-backscanning focal plane array at a ground speed of 280 kts. The RER of the non-backscanning focal plane array travelling at a ground speed of 280 kts at the zero pixel is 0.34141.

A third focal plane array configuration is a backscanning focal plane array configuration illustrated by trace 1018 mounted on a test vehicle that simulates motion of the focal plane array at a ground speed of 280 kts. The backscanning focal plane array can be implemented by backscanning an image via rotation of a transparent plate during motion of the imaging system as described herein. The RER of the backscanning focal plane array at the zero pixel is 0.52953. The plot 1000 illustrates that the RER of the non-backscanning focal plane array is degraded 1020 by ~35% from the static focal plane array. The degraded RER is due to smearing caused by the motion of the focal plane array during the focal plane array integration time. The plot 1000 shows the RER of the backscanning focal plane array nearly equals the RER of the static focal plane array as the motion of the focal plane array is compensated for by backscanning via rotation of the transparent plate.

Another way in which the RER can be analyzed is by considering the linearity associated with uniformity of the pixel shift across an image captured at the focal plane array. As a standard, an image captured with a static focal plane array is used. Each pixel in the image is positioned at a pixel position. In an example embodiment, the pixel position in the backscanned image, compared to the initial pixel position in the static image, can have a registration error less than 10% of the pixel dimension across the entire image. As an example, if the focal plane array is a 640×480 array with a 12 µm pitch, less than 10% registration error would mean that each pixel in the image would be positioned less than 1.2 µm from the initial pixel position. In other words, each pixel will have a shift of less than 1.2 µm from the initial pixel position across the entire image. Within the bounds of this metric, a center pixel may have a registration error of zero, pixels half the distance from the center to the edge may have a registration error of 0.5 µm, and edge pixels may have a registration error of 1.0 µm. Thus, although the registration error may be different amounts at different portions of the image, the deviation for any given pixel will be less than 10% of the pixel dimension. In other embodiments, this pixel registration error can be less than 9%, less than 8%, less than 7%, less than 6%, less than 5%, less than 4%, less than 3%, less than 2%, or less than 1%.

In some embodiments, the controller 208 can determine an angular rotation velocity that is proportional to the aircraft or satellite ground velocity and causes the rotation of the transparent platen and the resulting backscan of the image to match the motion of the platform velocity and/or the image during image collection. The controller 208 can include one or more sensors to determine a velocity of the camera body 202. The velocity of the camera body 202 can be associated with the aircraft or satellite ground velocity. The one or more sensors can include, for example, positioning sensors, accelerometers, magnetometers, and the like. In some embodiments, the controller 208 can be communicatively coupled to the I/O module 210 and determine the velocity of the camera body 202 based on data received from the I/O Module 210. In other embodiments, the drive velocity can be pre-programmed based on a predetermined orbit velocity, such as a low earth orbit velocity.

As discussed, certain embodiments can be implemented in a satellite system, which can be relatively stable such that the stage velocity matches the platform velocity. Alternatively, embodiments can be implemented on aircraft, which may have slight deviations in stage velocity. Accordingly, a feedback loop can be implemented such that the rotation velocity is periodically updated on a real-time basis. Different techniques are possible such as correlating pixels between images or performing the process described with respect to FIGS. 7 and 9.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of using an imaging system comprising a focal plane with one or more detectors, a lens optically coupled to the focal plane, a transparent plate optically coupled to the focal plane and lens, the transparent plate being disposed between the focal plane and the lens, and an actuator coupled to the transparent plate, the actuator being configured to move the transparent plate in one or more directions relative to the focal plane, the method comprising:

receiving, at a first area of the focal plane through the lens, light from an object at a first time, wherein the imaging system is located in a first position relative to the object at the first time;

causing the actuator to move the transparent plate in response to movement of the imaging system relative to the object; and receiving, at the first area of the focal plane through the lens, light from the object at a second time, wherein the imaging system is located in a second position relative to the object at the second time.

2. The method of claim 1 wherein moving the transparent plate is rotating the transparent plate.

3. The method of claim 2 further comprising:
determining a travel velocity corresponding to the movement of the imaging system relative to the object; and
determining, based on the travel velocity, a rotation rate for the transparent plate,
wherein causing the actuator to rotate the transparent plate includes rotating the transparent plate at the determined rotation rate.

4. The method of claim 3 wherein the rotation rate is not constant, and wherein the rotation rate changes based on an angle position of the transparent plate.

5. The method of claim 3 further comprising determining, based on the travel velocity, a rotation direction for the transparent plate, wherein causing the actuator to rotate the transparent plate includes rotating the transparent plate in the determined rotation direction.

6. The method of claim 3 wherein the travel velocity corresponding to the movement of the imaging system corresponds to a travel velocity of at least one of an aircraft or a satellite.

7. The method of claim 1 further comprising causing the one or more detectors to capture image data.

8. The method of claim 1 wherein the one or more detectors are caused to capture image data during rotation of the transparent plate.

9. The method of claim 1 wherein rotation of the transparent plate causes light from the object to be received at the first area of the focal plane at both the first time and the second time.

10. The method of claim 1 wherein the transparent plate is a flat plate with no optical power or a curved plate with a predetermined optical power.

11. An imaging system, comprising:
a body;
a stage coupled to the body;
a focal plane array including one or more detectors and coupled to the stage, wherein the focal plane array is disposed in a focal plane;
a lens coupled to the body and optically coupled to the focal plane;
a transparent plate coupled to the body and optically coupled to the focal plane and lens, the transparent plate being disposed between the focal plane and the lens; and
an actuator coupled to the transparent plate, the actuator being configured to move the transparent plate in one or more directions relative to the focal plane.

12. The imaging system of claim 11 further comprising:
a controller coupled to the actuator and communicatively coupled to the one or more detectors, the controller comprising a processor and a computer readable medium, the computer readable medium comprising code, that when executed, causes the processor to:
determine a travel velocity of the focal plane,
cause the actuator to rotate the transparent plate in the one or more directions at a rotation rate corresponding to the travel velocity of the focal plane, and
cause the one or more detectors to capture image data while the actuator rotates the transparent plate.

13. The imaging system of claim 12 wherein the travel velocity of the focal plane array corresponds to a travel velocity of at least one of an aircraft or a satellite.

14. The imaging system of claim 11 further comprising a dewar coupled to the body, the dewar comprising an optical opening that is optically aligned with the lens, the focal plane, the one or more detectors, and the transparent plate, wherein the focal plane and the one or more detectors are disposed inside the dewar, and wherein the transparent plate is disposed outside of the dewar.

15. The imaging system of claim 14 wherein the lens is an outer lens, the imaging system further comprising:
one or more inner lenses disposed inside the dewar and optically aligned with the outer lens, the focal plane, the one or more detectors, the optical opening, and the transparent plate.

16. The imaging system of claim 15 further comprising an exit pupil disposed between the outer lens and the transparent plate.

17. The imaging system of claim 16 wherein the exit pupil is located proximate to the transparent plate.

18. The imaging system of claim 16 wherein the transparent plate is narrower and shorter than both the outer lens and the one or more inner lenses.

19. The imaging system of claim 11 wherein the transparent plate is a flat plate with no optical power or a curved plate with a predetermined optical power.

* * * * *